(12) United States Patent
Cooper et al.

(10) Patent No.: US 7,426,750 B2
(45) Date of Patent: Sep. 16, 2008

(54) NETWORK-BASED CONTENT DISTRIBUTION SYSTEM

(75) Inventors: Robin Ross Cooper, La Mesa, CA (US); Robert T. Kulakowski, Rancho Santa Fe, CA (US)

(73) Assignee: Verimatrix, Inc., San Diego, CA (US)

( * ) Notice: Subject to any disclaimer, the term of this patent is extended or adjusted under 35 U.S.C. 154(b) by 444 days.

(21) Appl. No.: 09/789,298

(22) Filed: Feb. 20, 2001

(65) Prior Publication Data

US 2001/0051996 A1    Dec. 13, 2001

Related U.S. Application Data

(60) Provisional application No. 60/250,445, filed on Nov. 30, 2000, provisional application No. 60/223,128, filed on Aug. 7, 2000, provisional application No. 60/209,506, filed on Jun. 5, 2000, provisional application No. 60/183,638, filed on Feb. 18, 2000.

(51) Int. Cl.
*H04L 9/00* (2006.01)
*H04L 9/32* (2006.01)

(52) U.S. Cl. ............... 726/26; 726/27; 726/28; 726/29; 726/30; 705/50; 705/51

(58) Field of Classification Search ............. 713/176, 713/165, 193; 380/201, 252
See application file for complete search history.

(56) References Cited

U.S. PATENT DOCUMENTS

| 5,509,070 | A | * | 4/1996 | Schull | ............... 705/54 |
|---|---|---|---|---|---|
| 5,613,004 | A | * | 3/1997 | Cooperman et al. | ............ 380/28 |
| 5,889,868 | A | * | 3/1999 | Moskowitz et al. | ......... 713/176 |
| 5,913,210 | A | * | 6/1999 | Call | .............................. 707/4 |
| 6,026,166 | A |   | 2/2000 | LeBourgeois | ................ 380/25 |
| 6,385,596 | B1 | * | 5/2002 | Wiser et al. | ................... 705/51 |
| 6,389,538 | B1 | * | 5/2002 | Gruse et al. | ................. 713/194 |
| 6,574,609 | B1 |   | 6/2003 | Downs et al. |  |
| 6,735,699 | B1 | * | 5/2004 | Sasaki et al. | ................ 713/200 |
| 6,789,188 | B1 | * | 9/2004 | Epstein et al. | .............. 713/155 |
| 6,804,779 | B1 | * | 10/2004 | Carroni et al. | .............. 713/176 |
| 6,898,706 | B1 | * | 5/2005 | Venkatesan et al. | ......... 713/167 |
| 6,915,481 | B1 | * | 7/2005 | Tewfik et al. | ............... 715/202 |
| 2003/0093665 | A1 |   | 5/2003 | Cooper et al. |  |

OTHER PUBLICATIONS

Chi, C.H., et al., *Automatic proxy-based watermarking for WWW*, Computer Communications, Elsevier Science Publishers BV., Amsterdam, NL, vol. 24, No. 2, Feb. 1, 2000, pp. 144-154.

* cited by examiner

*Primary Examiner*—Kimyen Vu
*Assistant Examiner*—Ponnoreay Pich
(74) *Attorney, Agent, or Firm*—Procopio, Cory, Hargreaves & Savitch, LLP

(57) ABSTRACT

A method and system for transferring electronic media information over a public network in such a way as to provide safeguards for inappropriate distribution of copyright or otherwise protected materials are described. The media information is transparently watermarked with a unique ID, such as one generated from X.509 Digital Certificate and public-key cryptography public/private key pairs, such that the information can be identified as belonging to a particular individual. A system and method for monitoring the movement of such watermarked files, positively identifying people who have inappropriately distributed copyright materials over a public network without permission, and taking appropriate enforcement action against such people.

25 Claims, 7 Drawing Sheets

NETWORK-BASED CONTENT DISTRIBUTION SYSTEM

RELATED APPLICATIONS

This application claims priority to U.S. Provisional Application No. 60/250,445, filed Nov. 30, 2000, U.S. Provisional Application No. 60/223,128, filed Aug. 7, 2000, U.S. Provisional Application No. 60/209,506, filed Jun. 5, 2000, U.S. Provisional Application No. 60/183,638, filed Feb. 18, 2000, and U.S. application Ser. No. 09/782,707 filed Feb. 12, 2001 titled "WEB BASED HUMAN SERVICES CONFERENCING NETWORK," all of which are hereby incorporated by reference.

BACKGROUND OF THE INVENTION

1. Field of the Invention

The present invention relates to the field of electronic media file content distribution. Additionally, the invention relates to embedding unique electronic signature information, referred to as watermarks, and inserting these watermarks into an electronic media file to facilitate the authentication of the person responsible for the file.

2. Description of the Related Art

The use of the Internet and the World Wide Web as tools for content delivery and e-commerce has increased dramatically in recent years. As a consequence, the delivery of electronic media content materials such as music, videos, software, books, multi-media presentations, images, and other electronic media over a network to one or more consumers has likewise increased dramatically. Users may download such electronic media files legitimately from a content provider, for example a record label such as Sony Records or Capitol Records, or inappropriately from one of the content download services without the permission of the copyright owner. Using a network such as the Internet, users may, and quite frequently do, transfer digital media files they have downloaded, whether legitimately or otherwise, to others.

In this way, consumers of electronic media information may simply and freely distribute such media information over a public network such as the Internet without the permission of the copyright owner (or other property rights owners). Such consumers who inappropriately distribute copyright material over public networks cannot currently be positively identified, if they can even be tracked down at all. Therefore, these consumers can quite often successfully deny culpability.

A prevalent concern within the media publishing and/or distribution business is that the supply vs. demand equation that drives the economics of valuable goods and services no longer applies to digital media. Since a digital media file such as a music or movie file can be duplicated essentially an unlimited number of times and distributed at virtually no cost, the economics for providing such digital materials to the public is not viable. In order to return the supply versus demand equation back to the digital media domain, individual digital media files must be configured in such a way as to give them properties similar to physical objects. With such physical properties, these files can be handled and monitored in ways that are similar to physical objects, thus allowing the return of the necessary economic incentives and viability.

To date, there have been various approaches to solving the problems associated with the management, control and distribution of digital media files. Most of these approaches focus on protecting digital media files in such a way as to limit the functionality of such files when outside of the domain that has been pre-approved by the authorized distributor of such media. An example is found in the distribution of encrypted digital information along with an encryption key that will only decrypt the information under a limited number of circumstances.

Although encryption schemes have provided solutions to other problems involving digital media content, it is not the preeminent answer to the problem of identifying and monitoring content files. For example, encryption schemes provide an unsatisfactory solution for digital media for the following reasons:

1) Encryption schemes are often targets for many hackers, and it is typically only a matter of time before decryption algorithms will be discovered and published on a wide scale.
2) The market is overwhelmed with a number of encryption schemes. Therefore, no single standard is likely to be adopted and enforced.
3) Encryption adds a great deal of expense to the distribution of digital media. In some cases, this extra expense may make the difference between profitable and unprofitable distribution.
4) Encryption adds a layer of complexity for the consumer that will most likely result in lower consumer satisfaction.
5) Popular media sharing facilities, for example Napster, have educated tens of millions of consumers about the ease with which media files can be transferred. It may in fact be too late to successfully change the accepted model for electronic media distribution.

Consumers might possibly have embraced encryption of digital media files had it been introduced on a large scale before the Napster file-sharing model. Consumers generally will learn to accept models that add a level of complexity if these models are in fact the only models available. However, the complexities that content distributors would like to introduce into the market with encryption will arrive after the superior model has been introduced. This will likely result in media content file protection schemes such as encryption and copy protection disappearing over time.

SUMMARY OF THE INVENTION

The solution to the numerous problems confronting the rights owners of digital media is, therefore, not simply an issue of adding encryption. It is more accurately an issue of uniquely marking and identifying digital media files with authenticated information from a trusted authority and making business decisions that will maximize the potential return-on-investment for such files. Therefore, there is a need in the electronic media content distribution field to be able to mark content files with an authenticated digital signature that uniquely identifies the person who is the source, to be able to monitor the files if they are transferred to others, and to have these capabilities while imposing minimal burden and inconvenience on the consumer.

One aspect of this system relates to a system for network-based content distribution. The system includes an interface module configured to interface with a network. A transaction module is coupled to the interface module and configured to initialize a transaction with the user, authenticate the identity of a user, obtain a digital certificate related to said user, search for content desired by said user, implement a payment transaction with the user, generate a watermark related to said user and transfer content to said user, and insert said watermark into said content. A transaction database is configured to store information related to transactions carried out by the transaction module. An archive database is configured to store content selected by users. A certification authority is configured to authenticate users and issue digital certificates.

Another aspect of the invention relates to a method for distributing content over a network. The method includes initiating a transaction with the user. The digital certificate of the user is then authenticated. The user is allowed to search for and select content to be downloaded. A watermark is generated by the system which relates to the content to be downloaded, the source of the content and the identity of the user. The watermark is inserted into the content prior to its downloading to the user.

Another aspect of the invention relates to a method for verifying, searching for and identifying content accessible over a network. The method includes identifying files which are accessible over the network. For each such identified file, the file is searched to determine whether it includes a watermark which is related to the source of the content and the identification of the authorized user of the content. The method then involves determining whether the present location of the content with the watermark is an authorized location.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate various embodiments of the invention, and not to limit the scope of the invention.

DETAILED DESCRIPTION

Definitions

Figure 1:
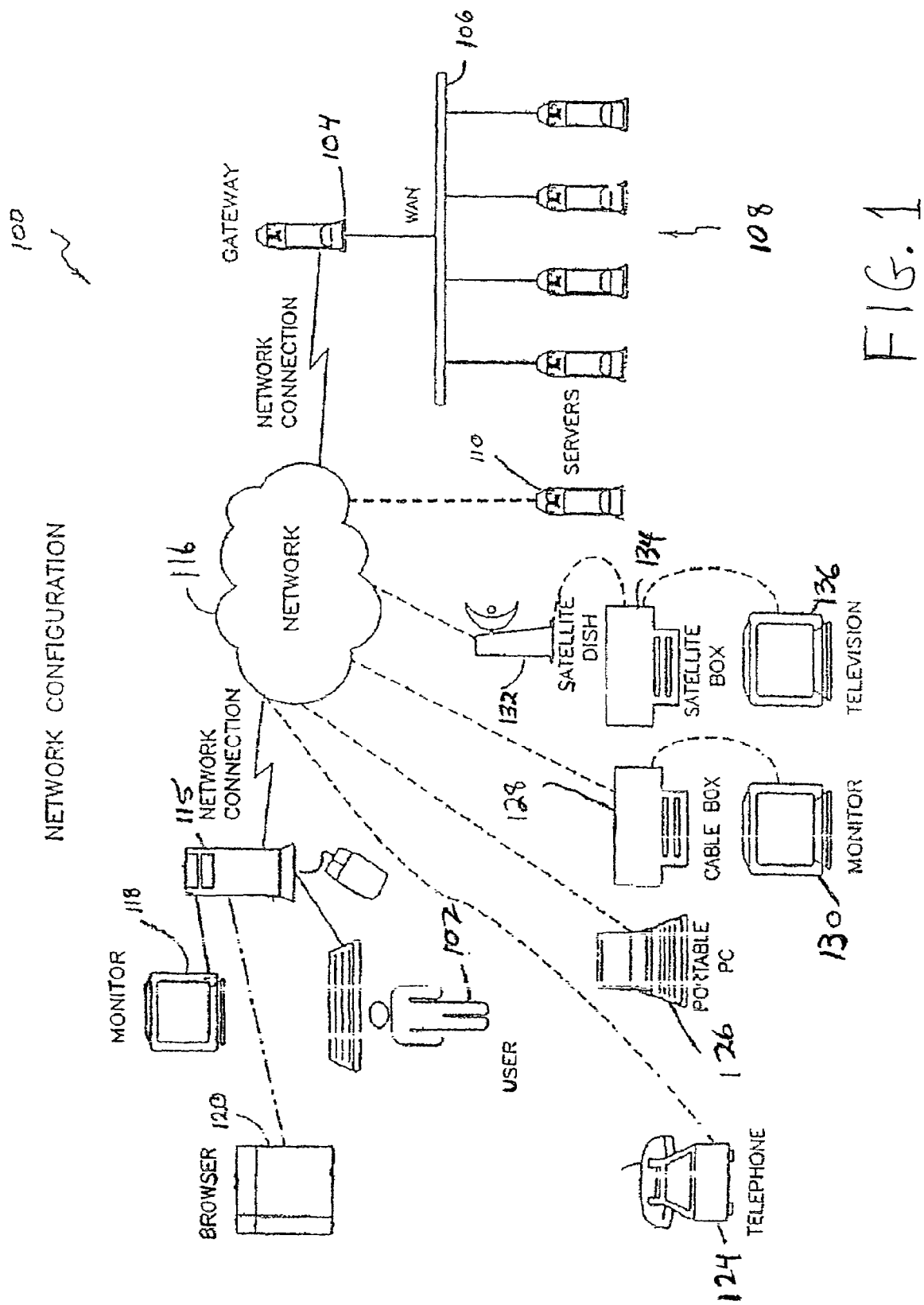
FIG. 1 illustrates a typical network configuration in which this invention may operate.

The following discussion provides a number of useful definitions of terms used in describing embodiments of the disclosed invention.

As used herein, the terms "network" and "Internet" refer to a network or combination of networks spanning any geographical area, such as a local area network, wide area network, regional network, national network, and/or global network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

As used herein, a VPN is a secure and encrypted communications link between nodes on the Internet, a Wide Area Network (WAN), or an Intranet. These nodes can communicate with each other, however, it is virtually impossible for a hacker to either comprehend the meaning of the signals or send signals that are believed to be authentic. One secure communications technology that is designed to facilitate a VPN is Secure Sockets Layer (or SSL). Other secure communications technologies can be used as well. It is not a requirement that a VPN be a private network such as SITA, the international network for airline reservations.

As used herein, a VPN provider refers to software, hardware, or both that secure an audio/video conferencing session in such a way as to minimize the possibility that it can altered or inappropriately viewed or transmitted. A VPN can operate between a number of internet-enabled devices, for example, a VPN can run on two PCs that are connected together using well known security technologies. In another embodiment, a VPN can operate between a PC and a Web Site using security technologies. In yet another embodiment, a VPN can additionally operate between many PCs and/or many Web Sites. Hand-held devices, mobile phones, and web-enabled TV sets can be used as client devices instead of PCs as part of the VPN as well.

As used herein, the term "website" refers to one or more interrelated web page files and other files and programs on one or more web servers, the files and programs being accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

As used herein, a "web page" comprises that which is presented by a standard web browser in response to an http request specifying the URL by which the web page file is identified. A web page can include, for example, text, images, sound, video, and animation.

As used herein, "content file", "media content file" and "content data" refer to the delivery of electronic media content materials such as music, videos, software, books, multimedia presentations, images, and other electronic data, for example over a network to one or more consumers. Content data will typically be in the form of computer files for video, audio, program, data and other multimedia type content as well as actual physical copies of valuable content, for example CD-ROM, DVD, VCR, Audio, TV or radio broadcasted, streaming audio and video over networks, or other forms of embodying such information. The terms "content file", "media content file" and "content data" are used interchangeably herein.

As used herein, "consumer" and "user" refer to a person that seeks to transfer or download media content files, for example from a content provider or distributor. The terms "consumer" and "user" are used interchangeably herein.

As used herein, a computer, may be any microprocessor or processor controlled device that permits access to the Internet, including terminal devices, such as personal computers, workstations, servers, clients, mini computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a screen or other visual conveyance means and a speaker or other type of audio conveyance means.

These computers may be uni processor or multi processor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such a network interface card, a modem, or other network connection device suitable for connecting to the communication network. Furthermore, the computers execute an appropriate operating system such as Linux, Unix, Microsoft® Windows® 95, Microsoft® Windows® 98, Microsoft® Windows® NT, Apple® MacOS®, or IBM® OS/2®. As is conventional, the appropriate operating system includes a communications protocol implementation which handles all incoming and outgoing message traffic passed over the Internet. In other embodiments, while the operating system may differ depending on the type of computer, the operating system will continue to provide the appropriate communications protocols necessary to establish communication links with the Internet.

The computers may advantageously contain program logic, or other substrate configuration representing data and instructions, which cause the computer to operate in a specific and predefined manner as described herein. In one embodiment, the program logic may advantageously be implemented as one or more object frameworks or modules. These modules may advantageously be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may advantageously communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may advantageously be implemented to execute on one or more computers. In another embodiment, some of the components, modules, and databases may be implemented to execute on one or more computers external to the web site. In this instance, the web site includes program logic, which enables the web site to communicate with the externally implemented components, modules, and databases to perform the functions as disclosed herein.

As used herein, the term "consumer ID" refers to a positive digital identification of the user, computer, or player device owned by a person who downloads content, has access to content download systems, or can access the systems described in this patent. A positive digital identification may be any one or a plurality of the following: an individual's digital certificate, a digital certificate or digital certificate serial number digitally signed using the user's private key, a transactional ID digitally signed using a user's private key that can be verified via the user's public key, the serial numbers of computers or player devices owned by or registered to a user, a message received by a system containing verified biometrics data (fingerprint, face recognition, eye/retina recognition, voice recognition etc.), or other legally recognizable means to identify an individual.

As used herein, the term "digitally signing" includes the cryptographically standard process of using a private key to generate a message or message hash/digest that when decrypted using a public key validates that the message was generated using an individual's private key.

As used herein, the term "authentication" refers to making it possible for the receiver of a message or file to ascertain its origin, so that an intruder should not be able to masquerade as someone else.

As used herein, the term "integrity" refers to making it possible for the receiver of a message or file to verify that it has not been modified in transit, so that an intruder should not be able to substitute a false message for a legitimate one.

As used herein, the term "non-repudiation" refers to minimizing the possibility of a sender being able to falsely deny later that he participated in communications activities.

Additionally, this patent relates to new electronic signature laws passed in the US and Europe and soon to be passed in Japan. In late June of 2000, President Clinton signed the "Electronic Signatures in Global and National Commerce Act", or "E-Sign Bill". This bill puts the force of national law behind electronic signature transactions.

FIG. 1 illustrates a representative network configuration 100 in which this invention may be implemented. However, various other types of electronic devices communicating in a networked environment may also be used. A user 102, which may be a consumer or any other recipient of content files, communicates with a computing environment, which may include multiple server computers 108 or a single server computer 110 in a client/server relationship on a network communication medium 116. In a typical client/server environment, each of the server computers 108, 110 may include a server program that communicates with a client device 115, which may be a personal computer (PC), a hand-held electronic device, a mobile or cellular phone, a TV set or any number of other electronic devices.

The server computers 108, 110, and the client device 115 may each have any conventional general purpose single- or multi-chip microprocessor, for example a Pentium® processor, a Pentium® Pro processor, a 8051 processor, a MIPS® processor, a Power PC® processor, an ALPHA® processor or any other processor. In addition, the microprocessor may be any conventional special purpose microprocessor such as a digital signal processor or a graphics processor. Additionally, the server computers 108, 110 and the client device 115 may be desktop, server, portable, hand-held, set-top, or any other desired type of device. Furthermore, the server computers 108, 110 and the client device 115 each may be used in connection with various operating systems, including, for example, UNIX, LINUX, Disk Operating System (DOS), VxWorks, PalmOS, OS/2, Windows 3.X, Windows 95, Windows 98, and Windows NT.

The server computers 108, 110 and the client device 115 may each include a network terminal equipped with a video display, keyboard and pointing device. In one embodiment of the network configuration 100, the client device 115 includes a network browser 120 used to access the server computer 110. The network browser 120 may be, for example, Microsoft Internet Explorer or Netscape Navigator.

The user 102 at the client device 115 may utilize the browser 120 to remotely access the server program using a keyboard and/or pointing device and a visual display, such as a monitor 118. Although FIG. 1 shows only one client device 115, the network configuration 100 may include any number of client devices.

The network 116 may be any type of electronic transmission medium, for example, including but not limited to the following networks: a virtual private network (hereinafter VPN), a public Internet, a private Internet, a secure Internet, a private network, a public network, a value-added network, an intranet, or a wireless gateway. The term "Virtual Private Network" (VPN) refers to a secure and encrypted communications link between nodes on the Internet, a Wide Area Network (WAN), Intranet, or any other network transmission means. While the VPN nodes may communicate with each other, it is virtually impossible for a hacker to either comprehend the meaning of the signals or send signals that are believed to be authentic. One example of a secure communications technology that is designed to facilitate a VPN is the Secure Sockets Layer (SSL). It is contemplated by this application that there may be much better techniques other than SSL that may be deployed in order to scramble the data for content downloads. It is well known in the industry that other extremely effective scrambling techniques exist and are commonly used. Although SSL is a transport protocol, other scrambling techniques that are not transport protocol may be utilized. The non-SSL techniques may simply be techniques that will quickly and efficiently scramble and likewise unscramble the data that is being transmitted via the network.

While a VPN may be conducted on a private network, it may additionally be conducted on a public network as well. A VPN may include, for example, one or more client devices connected to a combination of web server(s), video archive server(s), source server(s), or Multi-Point Control Units (MCUs), which are secured using state-of-the-art security technologies.

In addition, the connectivity to the network may be, for example, via a remote modem, Ethernet (IEEE 802.3), Token Ring (IEEE 802.5), Fiber Distributed Datalink Interface (FDDI) or Asynchronous Transfer Mode (ATM). The network 116 may additionally connect to the client device 115 by use of a modem or by use of a network interface card that resides in the client device 115. The server computers 108 may be connected via a wide area network 106 to a network gateway 104, which provides access to the wide area network 106 via a high-speed, dedicated data circuit.

Devices other than the hardware configurations described above may be used to communicate with the server computers 108, 110. If the server computers 108, 110 are equipped with voice recognition or DTMF hardware, the user 102 may communicate with the server computers by use of a telephone 124. Other examples of connection devices for communicating with the server computers 108, 110 include a portable personal computer (PC) 126 with a modem or wireless connection interface, a cable interface device 128 connected to a visual display 130, or a satellite dish 132 connected to a satellite receiver 134 and a television 136. Still other methods of allowing communication between the user 102 and the server computers 108, 110 are contemplated by this application.

Additionally, the server computers 108, 110 and the client device 115 may not necessarily be located in the same room, building or complex. In fact, the server computers 108, 110 and the client device 115 could each be located in different physical locations, for example in different cities, states or countries. This geographic flexibility which networked communications allows is within the contemplation of this application.

Figure 2:
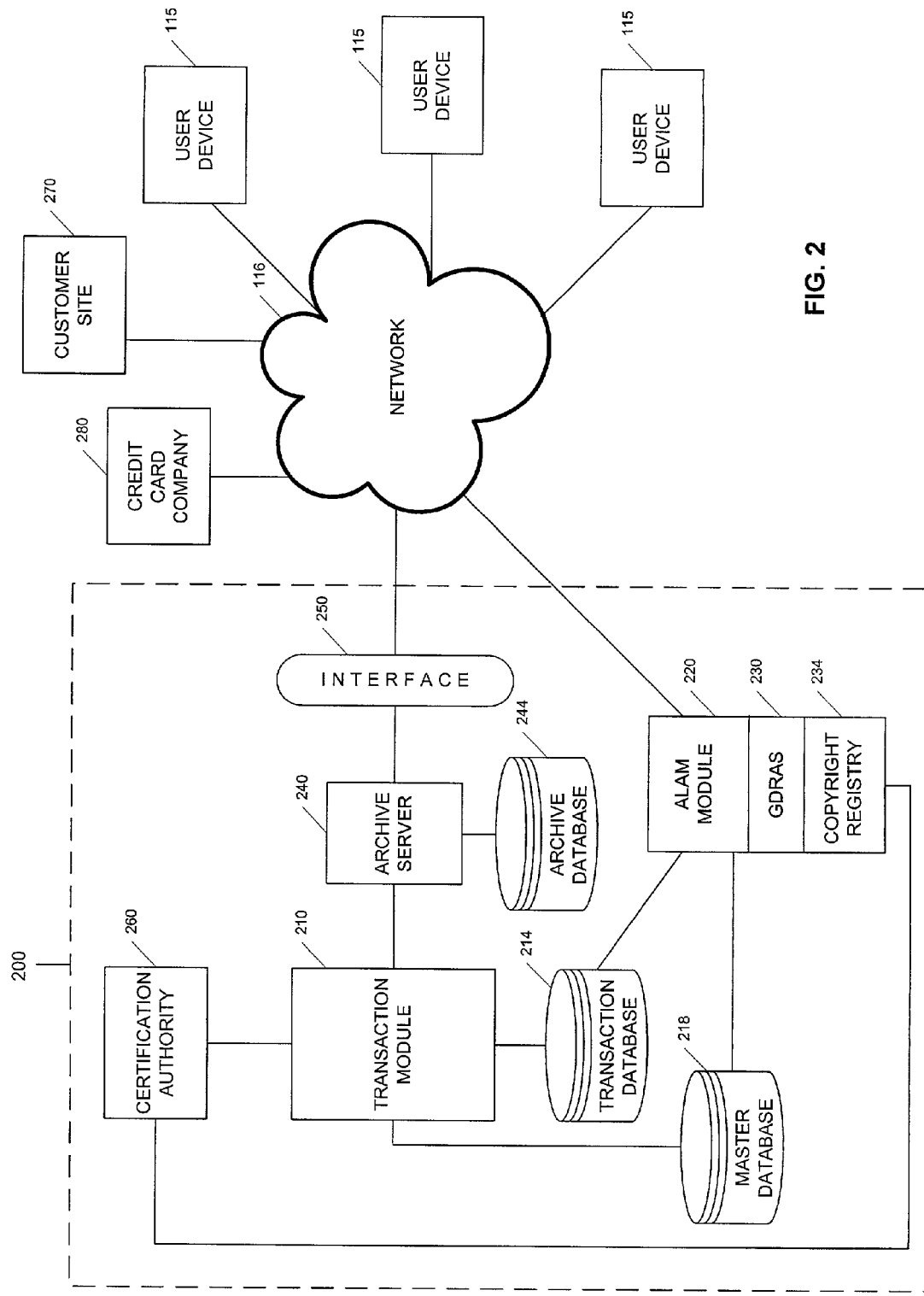
FIG. 2 is a block diagram of an example of a system overview architecture.

FIG. 2 is a block diagram of an example of a system overview architecture. The user devices 115 and network 116 are as described above in relation to FIG. 1. The user may obtain content media by initiating a transaction with a user device 115. A typical transaction may include the actions of initialization, authenticating the user, retrieving or storing a digital certificate, searching for and selecting content, payment, generating a watermark and embedding in the content, and transferring the content to the user. These actions will be described in further detail with regards to FIG. 3. A non-exhaustive list of several transactions includes a download session, a streaming session, a peer-to-peer session, a transfer to another user, a gift to another person, and re-sale of digital media files.

Transactions containing sensitive data may have the appropriate fields encrypted prior to storing and similarly be decrypted after retrieval. A secure link may be established between the customer site 270, the content distribution system 200 and the user device 115. The content distribution system 200 can include one or more servers 108, 110 as shown in FIG. 1. The customer site 270 may be, for example, a media content provider, media content distributor, or other customer system, also in the form of a server. Thus by encrypting the content data as it is transferred, a VPN may be established between the content and the user. This secure content distribution system is referred to hereinafter as a Content VPN.

An embodiment of a content distribution system site 200 may include an interface module 250, which can provide an easy-to-use and consistent user interface across the plurality of possible types of user devices 115. In one embodiment, this interface module 250 is a software module executing on a processor of the content distribution system 200. Additionally, it is also contemplated that portions or the entirety of the interface module 250 may execute at a user device 115 or at a customer site 270.

An archive server 240 may act as a temporary storage area or buffer between the customer site 270 and the user device 115 during content download. The archive server may comprise copying, encrypting, archiving and decrypting the media content, or any other type of binary or text data as well. When the consumer has been granted the ability to download certain content materials, the content materials now accessible to the consumer may be updated in the archive server 240 buffer for that consumer. In this way, the archive server 240 buffer may contain either a pointer to the media content or the actual media content itself. In a further embodiment, a number or string of characters that uniquely identify the content ordered by the consumer can be used rather than a pointer to the media content data. As one skilled in the art will recognize, the archive server 240 may be on a single computer or distributed across multiple computers.

Additionally, when downloading the media content material, the archive server 240 may be accessed in order to retrieve a pointer to the media content data or to locate the content data on the storage facilities within the archive server's 240 buffer. The media data stream may be buffered by the archive server 240 to enable both the encryption of the data stream and watermarking to be added to the data stream. Additionally contemplated is that the media streaming data may be buffered at other locations as well.

In one embodiment, the archive server 240 buffer is a computer database. This archive database 244 may reside on a database server that is accessible via the Internet, or may alternatively reside on an internal Intranet accessible only by the content distribution system 200 or the customer site system 270. This archive database 244 may be accessed using various database access tools well known by those skilled in the art, such as SQL, LDAP, ODBC, or other database protocols.

In one embodiment, the content distribution system 200 includes a master database 218. The master database 218 may additionally reside elsewhere, for example at the customer site 270, or on a database server that is accessible via the Internet or another communication network. This master database 218 may be used to store a copy of each media content transaction that has occurred in the transaction database 214, as well as information useful for tracking and auditing purposes to identify digital content that is being inappropriately copied and shared in connection with the Automatic Legal Action Management (ALAM) module 220. In one embodiment, a software module executing on a processor of the content distribution system 200 will be responsible for scanning user devices 115, customer sites 270 or other public network-accessible devices looking for copies of digital content that has been watermarked by the content distribution system 200. In the event an inappropriate copy is found, the master database 218 will contain information pointing to the original purchaser who can then be contacted for potential legal action, payment of a suitable royalty fee or other actions.

In one embodiment, certain fields in the master database 218 may contain sensitive information such as a customer name, digital certificate, or encryption key, and will be encrypted using a one-way hash algorithm to prevent unauthorized access by others. To provide an additional layer of security, the master database 218 server only accepts connections from designated transaction servers. The master database 218 may see high volumes of access requests, requiring a high capacity server, a multitude of database servers, or other manner of enhancing database access.

The Certification Authority 260 refers to the entity that will issue, validate, revoke, and otherwise manage the digital certificates for the content distribution system 200. In one embodiment, the Certification Authority 260 may be a large and well-known corporation that has established itself as being a trusted authority in the industry. It is additionally contemplated that virtually any entity, large or small, may perform the functions that are required of the Certification Authority 260. In a further embodiment, the content owner, customer site 270, content distribution system 200, cable or satellite television provider, telephone company, or other network 116 access provider may perform the certification functions. In one embodiment, the Certification Authority 260 may perform various operations using one or more servers, including but not limited to:

1) Validate a certificate when consumer enters the content distribution system 200 or customer site system 270.
2) Issue encryption key pair to the consumer's device or device gateway or use existing public/private key pair for this user/certificate.
3) Issue digital certificate(s) to a user's device or device gateway if it is a new device or user that needs a digital certificate.
4) Revoke a user's digital certificate(s).
5) Perform other operations relating to the management of digital certificates.

The Automated Legal Action Management (ALAM) module 220 includes an automated system for detecting and reporting unauthorized transfers of watermarked data streams. The ALAM module 220 reduces the amount of detective and legal work that would be required by the content rights owners and license holders of valuable content materials.

As is known by those in the art, software programs commonly referred to as "ferret" programs, web crawler programs, "robot" programs, or "bots" are designed to access a public network 116 such as the Internet and look for certain pieces of information. In one embodiment, a ferret program accesses web sites, links to other web sites, FTP sites, databases, or subdirectories on PCs providing the consumer has given permission for one or more designated subdirectories to be accessed. Additionally, the ALAM module 220 searches other networks besides the Internet, including but not limited to mailbox systems and Intranet systems, provided that the ALAM module 220 has authorization to connect and log-on to these networks.

In one embodiment, while searching these various networks, databases, or storage facilities, the ALAM module 220 only downloads content files that meet predetermined criteria. Predetermined criteria refers to the ALAM module 220 only downloading files that are determined to have a high probability of being in a place that is not approved by the right owner.

A ferret program may look for content materials that have predetermined markings within the file that prove the data are content that have been previously watermarked by the content distribution system 200. Once a ferret program locates such a file, the watermark or watermarks may be located and a command issued to the Certification Authority 260 to authenticate the validity of the digital certificate ID. If the Certification Authority 260 reports the watermark as being valid, an attempt is made to find a digital certificate on the device and compare the digital certificate ID numbers for a match. If no match of digital certificate ID numbers may be made or if the digital certificate information for the device cannot be obtained, a counter will accumulate for that selection of content and that digital certificate ID number. Once the counter reaches a predetermined threshold number, a letter may be automatically generated and sent via e-mail, postal service, or other delivery method to the owner of the digital certificate.

In one embodiment, the ALAM module 220 requires that the content pirate pay a copy charge for each copy inappropriately transferred to another person. For example, a pirate may download content with a valid digital certificate ID number embedded within the content. This same pirate may copy this content file containing their digital certificate ID number to a content sharing facility that is available to the public at large. Examples of such content sharing facilities are Napster and Gnutella systems, although there are others as well. Having made this content available to the public at no charge, the content file containing the responsible person's digital certificate ID number may be copied a large number of times as peer groups share content with other peer groups, typically at no charge and often in violation of the owner's rights.

In one embodiment of such theft detection of content data, many of the copies of the content file containing the digital certificate ID number may be located and a copy charge may be determined based on the number of copies inappropriately distributed. Once such a copy charge is determined, the pirate may then be charged for the piracy. One example of a way to determine a copy charge is to multiply the number of pirated copies of content by the retail price for that content file. There are other ways to determine a copy charge as well, which are also within the contemplation of this application.

In another embodiment, upon determining the appropriate copy charge, the pirate may be notified via e-mail, postal mail, registered mail, in person, or by other allowable manners of notification. The pirate may be given various payment options, for example to pay the full amount due immediately, make payments in accordance with a payment plan, pay an amnesty amount in addition to the promise to cease using public content sharing sites, or other agreed upon restitution options.

In addition, it may possible the pirate's credit card may be charged automatically as long as the pirate has agreed to this condition beforehand and this agreement can be authenticated as being signed, i.e. agreed to, by the pirate. It is further possible to make software programs available to the pirate that will monitor content sharing functions that might take place without the pirate's knowledge. Such a software program can be downloaded and installed on a client-side PC or other user device 115. When a content sharing application is accessed, the user may be alerted or the content sharing application may be shut down if the user so desires. In the event a pirate refuses to pay, an appropriate "refusal of payment" report may be sent to the major credit reporting agencies. In this way, piracy is simply handled as an ordinary e-commerce transaction where a responsible party refuses payment.

To further facilitate the collection of pirate charges, the "E-Sign" law in the US and many similar laws around the world may be leveraged to both prove (in court if necessary) the responsibility of the person who inappropriately distributed the copyright materials and compel the responsible person to make the appropriate restitution to the owners of the copyright materials. In addition, further such automated legal activity may be initiated if another selection of content using the same digital certificate ID is generated in the future.

These ferret systems may find many occurrences where content data has been inappropriately downloaded and distributed to unauthorized users. In one embodiment, the content and license owners do not need to physically track and prosecute these hackers, as the detection and prosecution procedures are performed automatically. Where content data has been inappropriately distributed to unauthorized persons, it is assumed that the user has decrypted the data and has made at least one copy of the decrypted data that still has the watermarks inside the data stream.

In addition, there are other well-known and common methods for searching for watermarks within content data that are being transmitted over a given network. These methods may be used to detect the inappropriate transmission of watermarked content data and automatically initiate legal actions. Such additional methods of detection and enforcement are within the contemplation of this application.

Additionally, an encrypted message may appear in the content that can only be decrypted using the consumer's public key, which indicates that the consumer's private key was used to encrypt the message. If the decryption process yields a clear text message that is previously known to the customer site 270 B2C partner, it is certain that the consumer has been authenticated as being the person responsible for the content download.

In one embodiment, as the ALAM module 220 performs its operations, it may encounter media files that either have no watermarks or the watermarks cannot be identified or authenticated. When such content files are found without watermarking, a statistical database may be updated, however no legal activities or other types of enforcement may take place unless there is a requisite level of evidence proving piracy.

In one embodiment, the ALAM module 220 will consider several factors regarding various media content. For example, it is appropriate for the owner of a CD-ROM to resell it, for example to a store in the business of reselling used CD-ROMs. In addition, it is also appropriate to share CD-ROMs with friends and family. This same principle applies to digital electronic files as well. Content files may appropriately travel to various destinations. By providing a system and a facility for allowing the electronic signing of the content file digital certificates or transactional IDs, it is possible to prove that the user appropriately handled content files. By examining the watermarked digital certificate or transactional ID for a particular content file and then examining each time the digital certificate or transactional ID was signed, it is possible to see how the content file was appropriately transferred from location to location. In this way, for example, a retail establishment such as a reseller of CD-ROMs or DVDs may wish to have these physical copies electronically signed in order to prove that the disks have been obtained legally and are now the property of the retail establishment.

In another embodiment, to further enable the ALAM module 220 to enforce owner's rights, it may be possible to offer a plurality of incentive programs to consumers to encourage them to help track the movement of content files. For example, a consumer may be encouraged to go to a particular web site and register each new CD-ROM or DVD that is purchased. By doing so, the content VPN described in this application may electronically sign the digital certificates while moving from place to place. As a reward for such content registration, the user may receive valuable rewards, products, or services in return.

An example of this content registration and tracking may include:
1) Assigning a unique digital certificate or transactional ID and embedding the serial number within the watermark
2) Providing the consumer with registration incentives, such as providing one free copy of content for every 10 content files that are registered
3) Electronically signing the digital certificate at the appropriate content system
4) Allowing the consumer to decide to transfer ownership of the content to another
5) Performing the approved content transfer, for example via a website
6) Electronically signing the digital certificate at the appropriate content system using the private key of the original owner, or the private key of the new owner, or both, to prove it was appropriately authorized.

A Global Digital Rights Apportionment System (GDRAS) 230 makes it possible to apportion the money that is designated for artists, copyright owners, content owners, and other deserving entities in an efficient manner. A GDRAS 230 monitors digital certificates that are issued specifically for content files. In addition, the GDRAS 230 checks the transaction database 214 for the total amount of money collected from the user, and apportion all monies collected appropriately. In some cases, money will go to customer sites 270. In other cases, money will go to royalty collection bodies, for example the Recording Industry Association of America (RIAA), or other appropriate individual or entity.

A Copyright Registry System 234 allows artists, copyright owners, and other content owners to register their valuable digital content. An embodiment of a Copyright Registry System 234 includes the following:

1) The consumer may use the user device 115 to log on to the Copyright Registry System 234, for example by accessing a web page. A check is made to determine if the consumer has a valid digital certificate or private key/public key pair. If not, or if they are out-of-date, then the Copyright Registry System 234 may prompts the user as necessary to obtain a new and valid X.509 digital certificate/private public key pair. The Certification Authority 260 may be used to issue necessary digital certificates or key pairs as described in detail above.

2) The consumer may be prompted to identify the type of content to be registered. For example, the consumer may wish to register one or more of the following types of content: music, books, multi-media, video, software, printed media, or other types of digital media content.

3) Once the consumer accurately identifies the type of content to register, the following operations may take place:
    a) The consumer formally requests that the content file be registered. The payment 340 portion of the Transaction module 210 may be updated appropriately.
    b) The content file may be uploaded to a Copyright Registry System 234 website
    c) The Copyright Registry System 234 website may issue a new and unique X.509 digital certificate or unique message for the content file
    d) The Copyright Registry System 234 website watermarks each content file with a serial number or message for each new and unique digital certificate issued
    e) The Copyright Registry System 234 website may optionally encrypt a clear text message with the user's private key and store this encrypted message within the watermark as well. Only the Copyright Registry System 234 website may be able to decrypt the user's private key. This may be replaced by the optional operation of signing a clear text message with the content owner's private key and storing the signed message within the content using watermark technology.
    f) The Copyright Registry System 234 website may optionally add a clear text message with the user's public key and then store this message within the watermark as well. Content owner's public key does not need to be encrypted.
    g) The content distribution system 200 may then communicate with the archive server 240
    h) The archive server 240 may then store transactional data in a transaction database 214
    i) The archive server 240 may additionally store the consumer's public key
    j) The archive server 240 may additionally store the watermarked content file
    k) The archive server 240 may additionally store the clear text message in its database
    l) The archive server 240 may finally store a list of e-mail addresses for the users of the service. This list of e-mail addresses may be used to communicate with the users of this Copyright Registry System 234.
    m) The archive server 240 may transmit a fully watermarked copy of the content file back to the user's device 115 via an FTP transfer or e-mail message 4) An e-mail message back to the consumer typically may contain a thorough explanation of the following:
    a) The watermarking process
    b) The digital certificate information
    c) The method for searching for the watermark and the digital certificate
    d) Helpful software programs, tools, and applications available to the consumer easily obtained from the web or other public network
    e) Other pertinent information 5) Transmit a copy of the watermarked content file to be electronically filed with a governmental patent and copyright office such as the U.S. Patent and Trademark Office or the Copyright Office The benefits of the Copyright Registry System 234 include:

1) The watermarked copy of the user's content may now be distributed over the network 116
2) An X.509 digital certificate or signed message is generated to prove the authenticity of the person who filed the content with the Copyright Registry 234
3) A clear text message in the watermark within the archive server 240 may further prove the authenticity of the person who filed the content with the Copyright Registry 234. The authenticity of the watermark may similarly be established.
4) A copy of the watermarked content may remain in the archive database 244
5) A copy of the watermarked content may be transmitted to a governmental patent or copyright agency for registration and protection With a Content Registry system 234, a player of content may check the registry to see if an identical digital certificate is being played by another player device. This may be achieved by communicating with the Copyright Registry 234 on-line using a network 116, for example the Internet, an Intranet, or other network. Certain in-use switches may be set to indicate that a user is currently using a particular content file. Following is an example of this. A software program that has been previously registered with the Copyright Registry 234 is initiated by an end user. During the program initialization process, the Copyright Registry 234 is checked to see if someone else is using the same software program with the same digital certificate. If so, then piracy has been detected and the author or publisher may decide how best to communicate an appropriate message to the parties using the software. If a no match condition is found, the content file plays normally. When the content file reaches its end, then the Copyright Registry 234 may be updated to indicate that the content file and the digital certificate for that content file are no longer being played. An in-use switch will be set back to False, Null, Zero, or other value that indicates the content is no longer being played.

Figure 3:
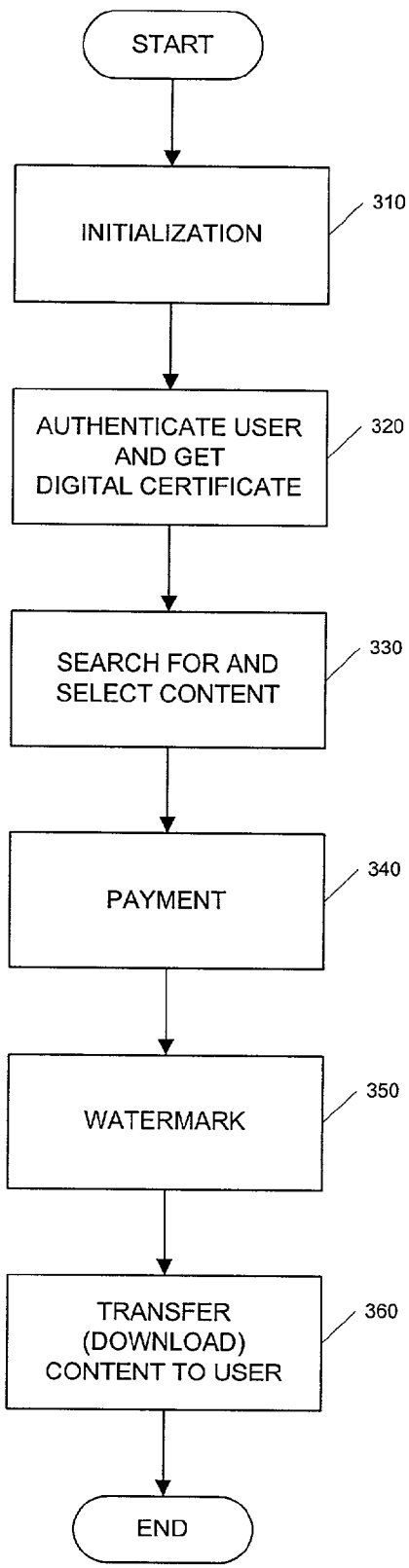
FIG. 3 is a flowchart of a process of conducting a media content transaction.

FIG. 3 is a flowchart of a process of conducting a media content transaction performed by the Transaction module 210 of FIG. 2. Each of the blocks of FIG. 3 represents a series of actions or steps. These steps can be carried out by the Transaction module 210 and/or can be carried out by sub-modules within the Transaction module 210 with each block representing one of those sub-modules. Alternatively, various modules of the content distribution system 200 can perform one or more of the steps depicted in FIG. 3.

The process begins with an Initialization step 310. If this is the first time this particular user has attempted to log on to the content distribution system 200, the Initialization step 310 gathers certain account information from the user, for example a desired account name (which must be unique) or password, legal name, complete address, social security number, out-of-wallet verification information such as mother's maiden name, credit information, voter registration information, or credit card information. In another embodiment, the Initialization step 310 collects smart card, phone card, or other payment card information from the user for payment of account charges. For the user's that have already gone through this account set-up process, the Initialization step 310 only prompts for the account name and password.

In one embodiment, it will be necessary for the user and potential consumer to assent to a signed, legally binding agreement before being allowed to purchase and download media content data. For example, the agreement may state that the user will not inappropriately distribute copyright materials without the necessary permission from the media rights owner. For added security, the agreements may be encrypted so that only the appropriate people can view these agreements. The user will need to be able to clearly read the terms and conditions for properly handling electronic copyright materials. Furthermore, the user must agree not to inappropriately distribute this copyright material unless express permission is granted by the rights owner.

Once the user has entered into such an agreement, the recently signed E-Sign law will provide protection to the media rights owners and distributors of such copyright materials. Such an agreement may be consummated by having the end user simply click a button labeled "I Agree", or something similar, while the terms and conditions are being prominently displayed on the screen by the Initialization step 310. By clicking on a button labeled "I Agree", a binding agreement comes into existence between the end user and the rights owner.

In order to prove the agreement was consummated by the end user, it will need to be "signed" by using the user's private key to encrypt some or all of the agreement, or evidence of the agreement, that the user approved. In doing so, it will be relatively easy to demonstrate that the user did in fact agree to the terms and conditions of the agreement, with the user's public key performing the decryption process to provide adequate proof. In a further embodiment, the user may optionally request to review the agreement with all its terms and conditions should the end user wish to refer to this agreement. Therefore, the agreement may be stored in such a way as to be easily accessible to the end user. Such an agreement may be stored at the Certification Authority 260, the transaction database 214, customer site 270, or other locations where there is adequate storage and access over the network 116.

Once all necessary account information has been transmitted by the user and the user has affirmed this information as being correct and complete, the Initialization step 310 verifies and authorizes the payment card information obtained from the user. For example, an on-line method may be used by the Initialization step 310 to check the name, social security number, address, and other information with one or more credit card companies 280 of a user. Additionally, it is possible for the Initialization step 310 to require that a credit card or smart card number be entered into the VPN in order to allow certain people access to certain accounts. When this credit card information is entered, verification processes can be initiated by the Initialization step 310 that will further verify and authenticate the identity of the user. In one embodiment, smart cards, phone cards or credit cards, for example, containing user verification information may be scanned into a mechanism such as a credit card scanner and the information previously written to the magnetic strip of the card can be used by the Initialization step 310 to verify a user on the Content VPN.

In a further embodiment, verification information may be written by the Initialization step 310 to credit cards, for example MasterCharge or Visa cards. Verification information may additionally be written to phone cards, for example AT&T Phone Cards or MCI Phone Cards. Additionally, verification information may be written to smart cards that are used solely to identify a user on a computer system. On certain VPN applications it is possible that a user may scan or swipe the card in order to gain access. The verification information scanned from the card may be saved along with the streaming video and the encryption keys.

Such a payment card may be used to allow a user to access a public terminal for the VPN. If such a user device 115 is available to the public in a public location, for example at a hotel or airport, it will be important that either a biometrics mechanism or a payment card of some type be scanned for user verification information by the Initialization step 310. A biometrics mechanism refers to certain techniques that exist today for verifying the identity of any individual, for example a retinal scanner (i.e. eye scanner), fingerprint scanner, thumbprint scanner, DNA scanner, or other type of biometrics scanning mechanism. In one embodiment for using a biometrics device, the biometrics device may be used along with the encryption keys and digital certificates. The scanned image created by the biometrics scanner may be saved along with the agreement. The scanned image containing biometrics information may additionally be saved along with the session and public encryption keys as well.

A public terminal for the VPN may be similar to a desktop PC, however the card may act as the memory device for the user during the session at the public terminal. The public encryption key may reside on the card as well as other important verification information. Additionally, the digital certificate information may be written to the magnetic strip on the card as well by the Initialization step 310. For example, the information on such a card may include, but is not limited to, name, address, social security number, date of birth, credit card information, public encryption key, or private encryption key. This type of public terminal may enable a user to access a Content VPN while traveling potentially anywhere in the world.

The Transaction module 210 process includes an Authenticate User and Get Digital Certificate step 320. One way to protect electronic media content over a public network is to use digital certificate technology that is defined by the X.509 protocol defined by the well-known IETF and ITU Standards Committees. Digital certificate technology has been available for decades for securing web sites, e-mail, FTP transmissions, VPNs, and other communications techniques over public networks, including the Internet. Several leading companies that have deployed digital certificate technology are Verisign, CyberTrust, Thawt, and RSA. These companies have worked diligently to bring digital certificate technology into everyday practice for multitudes of users on the Internet. It is likely, if not practically imminent, that digital certificate usage will soon become the rule rather than the exception.

A well-known concept developed by the telecommunications standards committees and companies such as RSA includes issuing to a user on a network two encryption keys. This Public Key Infrastructure (PKI) information consists of a pair of keys, a public key and a private key. The public key can be published to friends and partners around the world. The private key is always kept on only one computer, mobile phone, hand-held device, television set, or other user device 115. At least one key, either the Public or Private key, is required to be stored such that it is available to the user device 115.

After the Certification Authority 260 (see FIG. 2) generates a pair of such encryption keys, a digital certificate may also be created. The digital certificate provides the necessary links back to a company or person who can be trusted. This trusted company or person is called a Trusted Authority (TA). When a computer, mobile phone, hand-held device, television set or other user device 115 has an encryption key pair and a digital certificate issued by a TA, then the device is considered to be secure.

Virtually all Web Browser programs, including for example Netscape and Internet Explorer, have a mechanism to store and manipulate encryption keys and digital certificates. It is common to see an area reserved for the creation, storage, and usage of digital certificates under the menu item named "options" or "preferences" in such Web Browser programs.

The architecture of the content distribution system 200 disclosed in this application may be designed in such a way as to use digital certificates that are generated by a multitude of digital certificate authorities, many of which may even be generated from countries other than the United States. Since it is contemplated that the content distribution system 200 will be an international network, it is anticipated that customers as well as business from different parts of the world will prefer to purchase digital certificates from a Certification Authority 260 that might be physically located close to the customer or business. It is also anticipated that the digital certificate business will become an enormous industry over the next decade. In one embodiment, the providers of the VPN themselves may additionally generate and issue digital certificates designed around the X.509 protocol.

As these digital certificates are issued to the various content source Business-to-Consumer (B2C) partner customer sites 270 and user devices 115, it is important that a person responsible for the transactions on such a content VPN be authenticated. The term "authenticated" refers to ensuring a responsible person is positively identified as being liable for a transaction. Without a robust authentication process, unauthorized persons, for example hackers, may enter such a content VPN and download content files with no intention of paying. Likewise, the content provider will have no idea who is the person responsible for the downloaded content data. There are many ways to authenticate people over a public network such as the Internet, several of which are described herein to provide examples of such.

In one embodiment, the method for authenticating a consumer may be by the Authenticate User and Get Digital Certificate step 320 verifying that the consumer's credit card is active and in good standing. Since a banking organization at one time issued credit to this user, the Authenticate User and Get Digital Certificate step 320 may assume this person has completed an interview process and has signed the appropriate legal documents.

There are many ways for such an Authenticate User and Get Digital Certificate step 320 to authenticate a consumer using a credit card, including for example:

1) Making a request to authenticate the consumer's credit card through the Certification Authority 260, which may pass the request for authorization on to the transaction database 214, to the Transaction module 210, and then to the credit card company 280.
2) Making a request to authenticate the consumer's credit card directly to the credit card company 280.
3) The B2C partner customer site 270 authenticating the consumer by going directly to the credit card company 280 that is being used.

For a consumer to create a digital certificate in the industry presently, the consumer must contact a trusted certification company, for example Verisign. Verisign will then take steps to verify the consumer is authorized to use certain network resources. Once Verisign is satisfied that a consumer should be granted network access, it sends a digital certificate to the consumer using various transmission mediums, for example via a network transmission protocol, an application program that will create the digital certificate on the consumer's hard drive, a floppy disk drive or other similar external storage medium, or other suitable transmission mediums.

A digital certificate is typically a small data file that can be transmitted or loaded into a web browser or e-mail applications program, although other digital certificate formats are contemplated by this application. Digital certificates typically have an area of storage within the file set aside called the Certificate Policy Statement (CPS). The CPS may be a text-based field inside the digital certificate that is designed to store individualized information about the consumer on the network. This CPS area of the digital certificate may hold a pointer, or link, to a website that has a copy of the signed, binding agreement between the network customer site 270 and the user. In this way, all parties may review and otherwise refer to the agreement at virtually any time by using an application software program that captures a signature using mouse or pointer technology and transmitting the signature to the VPN provider, or other current or future means for capturing and transmitting the consumer's personal or private authorization.

Once placed on a specific user device 115, a digital certificate typically cannot be readily moved. When placing the digital certificate on a user device 115, a consumer and a content distribution system 200 issue and receive digital certificates with each other for the purposes of transmitting electronic media files. The consumer is verified as legitimate by a trusted authority and a digital certificate is issued on a specific hardware device on the network. At this point, it is possible that a crafty person (i.e. hacker) may log-on to an unsecured computer containing the appropriate digital certificates and masquerade as either a content provider or a consumer.

For this reason, other security precautions may be taken. The CPS may additionally contain a password that must be correctly matched by the legitimate consumer at the time the hardware device containing the digital certificate logs on to the VPN. If an attempt to enter the password fails more than a predetermined number of times, the digital certificate may be immediately revoked by the Authenticate User and Get Digital Certificate step 320 until a further investigation may be conducted.

It may be that all hardware equipment used by a network client must be secured with the appropriate passwords and security measures. This deters a crafty person from gaining unauthorized access to the hardware device. Additionally, it may be that all applications programs such as web browser programs and e-mail programs used during a VPN session be secured with the appropriate passwords and physical security means as well. An additional security measure may be a requirement that the consumer sign a release of liability claiming that the physical hardware devices are not misused or misappropriated or otherwise misused because the proper security measures were ignored.

Digital certificates may be used to enable parental controls to restrict access to minors of certain content. Each digital certificate issued to a device may contain a field indicating the appropriate level of exposure to sex, violence, or irreverence allowed for a particular playing device. If the device does not allow a digital certificate to be updated, or if the device cannot store a digital certificate at all, the user must indicate the level of exposure to sex, violence, or irreverence and capture this information in the transaction database 214. When the user selects content, a query is performed to determine if any parental controls are selected. If one or more parental controls are set, then an appropriate error message may appear if the level of exposure to sex, violence, or irreverence exceeds that which has been previously established.

Log files may be used extensively throughout the VPN. Each time an event takes place, an adequate message may be written to a log file. Log files may exist at many locations, including at a user device 115, content distribution system 200, Certification Authority 260, transaction database 214, customer site system 270, some independent agent or authority, or other logical or physical databases or locations. Log file contents may include the following information:

1) Messages indicating noteworthy events
2) Date and time
3) Public keys that were used
4) Session keys that were used
5) Other noteworthy encryption keys
6) Other information that may be helpful In one embodiment, although the user must answer questions and become authorized by the Authenticate User and Get Digital Certificate step 320 to use the network, the actual issuance of the digital certificates should be as easy to use and transparent as possible. To be successful in the marketplace, the consumer should be able to answer a few questions, for example via interactive prompts or by filling out an online form, and be able to use the content distribution system 200 within a few minutes. Although the technology involved is significantly complex, the capture of necessary information and the issuance of the digital certificates must be simple and nearly transparent to the consumer.

In one embodiment, each device has some example of a unique ID. This unique device ID may be used for a variety of purposes, for example for calculating the necessary values to properly build the key and certificate files for creating encryption keys and digital certificates. This application contemplates other purposes for which the unique device ID may be used.

Most user devices 115 typically include some type of unique number or code that positively and uniquely identify the device. For example, in some cases a sequential number is generated and embedded within the hardware, a database record, or the software running on the user device 115. Access to this unique number is usually an uncomplicated process. An example of accessing such a unique number is a simple query into one of the registry files found within Microsoft Windows operating system.

An example of a more state-of-the-art method for uniquely numbering user devices 115 is to generate either, as would be known to one skilled in the art, a Universally Unique ID (UUID) or a Globally Unique ID (GUID) by randomly generating a huge number that is statistically unique and then embedding this number within the hardware, a database record, or the software running on the user device 115. Other examples of unique numbering techniques include using the MAC Address, for example for a network interface card, or using a static IP address as the unique device ID number.

It is contemplated by this application that in the future devices such as CD players, DVD players, MP3 players, other music players, and other consumer electronic devices may already have digital certificates built-in from the factory. In this case, either the information embedded within the digital certificate or a copy of the digital certificate must be transmitted to the Certification Authority 260 by the Authenticate User and Get Digital Certificate step 320. Once the Certification Authority 260 receives this digital certificate information for this device, the streams of encrypted and watermarked data may then commence.

In one embodiment, the Authenticate User and Get Digital Certificate step 320 will capture such a unique device number and use it to further identify the user device 115 on the network. After capturing this unique device identifier, the system may save this identifier to one or more database fields that are associated with the digital certificate. The Authenticate User and Get Digital Certificate step 320 can use the user's digital certificate plus this unique device ID number to further authenticate both the device on the network and the end user who has access to this device.

It would not be unusual for any given user device 115 to have numerous digital certificates as it logs on to new websites and performs other Web or Internet operations. As it is possible and even common for PCs to have multiple digital certificates, it is also possible to have multiple digital certificates for consumer electronic devices and other types of user devices 115 as well. This multiple digital certificate capability adds flexibility for the consumer as the data streams may be accessed in a continually expanding number of ways. In addition, it is contemplated that new encryption methods may be employed that work for a group of devices rather than merely one single device.

It is contemplated by this application that each user device 115 will have some way to both store and manage digital certificates, although this may not always be the case. If the user device 115 is a PC, for example, the digital certificates may be stored within the Internet browser program, or within an e-mail program, for example, Microsoft Outlook, or Outlook Express. However, it is not the case that the digital certificate may only be stored within the digital certificate database in the browser or e-mail program. Digital certificates may also be stored virtually anywhere that has sufficient long-term storage capacity. One such example is a separate database in such a way as to be accessible by virtually any Internet or Web system or a language such as Java, VB Script, HTML, for example. Providing access to digital certificates stored outside of a Web browser may allow for a more transparent user interface, as the user will not be asked questions by the browser program as it is loading new digital certificates into the browser database. Such questions may include, for example: "Are you sure you want to load this digital certificate?", "This digital certificate is not trusted. Are you sure you want to proceed?", "Please select the digital certificate you would like to use?", or any number of other user prompts or questions.

In the embodiment where digital certificates are kept in a separate database, the database may exist on a separate subdirectory of a device. Additionally, such a database of digital certificates may be stored with other files on a device, or within a user device 115 software program. It is therefore contemplated that the Web browser may not be necessary in order to create the content VPN and there are a multitude of places where digital certificates may be stored and accessed by the user device 115.

In another embodiment, the digital certificates may be stored within a database at the Certification Authority 260. In addition to the digital certificates, other database fields may similarly be stored, maintained, or administrated from the Certification Authority 260. Several advantages for keeping the database of digital certificates and other database fields on the Certification Authority 260 are quicker and easier access of the digital Certificates and other database fields because there is no need to request this information from another system located elsewhere on the network 116.

The Transaction module 210 process includes a Search For and Select Content step 330. The customer sites 270 of valuable content materials, for example videos, music, books, software, multi-media, and other media content, hereinafter referred to as content data, may have their library of content materials located on their own servers, or on a server accessible over the public network 116. Content data typically may be in the form of computer files for video, audio, program, data or other multimedia content, as well as actual physical copies of valuable content, for example CD-ROM, DVD, VCR, Audio, TV or radio broadcasted, streaming audio or video over networks, or other forms of content. These customer sites 270 may deploy parallel systems for added protection in case of a failure.

In another embodiment, the customer sites 270 may be able to store their valuable content on the archive server 240 as well. In the event a customer site 270 may go out-of-business, it is possible to move the content in the archive server 240 so there is no disruption in service. Additionally, the archive server 240 may act as a temporary storage area or buffer while downloading data between the content source and the user device 115.

In one embodiment, when the user's digital certificate is determined by the Certification Authority 260 to be authentic and there are no problems with either the certificate or the consumer's account, the consumer may be allowed access to a multitude of network services, functions and information by the Search For and Select Content step 330. Once the consumer has connected to the content distribution system 200, or alternatively to a customer site 270 system, the consumer will have access to a multitude of network services, functions and information, including but not limited to the following:

1) A list of major content categories
2) A list of content items within each major content category
3) Parental controls or reviews of the each content item
4) A list of content items purchased by the consumer
5) Samples of content files that can be sampled or viewed
6) The consumer's account status
7) Advertisements and special promotions on certain content items
8) Download latency times that can be expected for certain downloads
9) Players and other software tools that can be downloaded that will help the consumer play or otherwise enjoy the content materials
10) Hardware devices and appliances that can be purchased and shipped to the consumer in order play or otherwise enjoy the content materials
11) Shipping and handling information that will be helpful if the consumer wishes to receive a physical copy from the content provider
12) A list of player devices registered for this user, for example MP3 players, computers, set-top boxes, Internet radios, cellular telephones, or other devices
13) Control functions to allow selling, moving, or copying content to other customers, or other players owned by the customer The Transaction module 210 process includes a Payment step 340. When a consumer decides to purchase and download content, that consumer places an order with the content distribution system 200 or one of a plurality of customer sites 270. This order may include the following or additional specifications from the consumer:

1) Save content to a file
2) Stream content to a device
3) Begin download immediately
4) Set a timer to deliver content at a specified date and time in the future
5) Deliver content to more than one device simultaneously
6) Provide subtitles for translation purposes or for the hearing impaired
7) Provide password protection to play content
8) Block content from being transferred if it contains explicit, violent, or otherwise harmful material
9) Language translation When an order is placed, a transaction entry will be made in the transaction database 214 along with the specifications requested by the user. At any time the consumer or the administrators of such a network may view the transactions that have occurred in the transaction database 214.

If the consumer has made a purchase, the Payment step 340 may automatically charge the consumer's account, for example credit card, phone card, smart card, or other payment method. The Payment step 340 may automatically pay all of the fees and royalties required by the customer sites 270, by copyright law, or by any other laws or agreements that are in effect.

The Transaction module 210 process includes a Watermark step 350. An effective way of identifying books, CDs, software and other such media products is to place a virtually invisible mark on the product itself that will uniquely identify the product, where it came from, and when it was downloaded. This virtually invisible mark is called a watermark. The process of placing hidden or transparent marks within content is commonly referred to as watermarking and is also called Stenography. The Watermark step 350 places such a watermark within a stream of data that is delivered between the source of the data, for example a customer site 270 and the user's device 115. The watermark cannot be removed or modified from the digital content without corrupting the digital content. In one embodiment, the watermark may be the consumer's ID that positively identifies the consumer. The consumer's ID, as described above, may be in the form of a digital certificate that has been issued to the user device 115, a signed transactional ID, a device or player serial number, or other unique ID. If necessary, the consumer's ID may point to the consumer's credit card information that is kept in the transaction database 214.

In one embodiment, the consumer's ID number is the digital certificate's serial number or digital certificate's ID number. Further embodiments include using as a watermark a unique transactional ID that can be linked via a transactional database back to the consumer who downloaded the content. The transactional database 214 may contain information that provides a record of all content downloaded or transferred to a user. Individual fields in the transactional database 214 may include a serial number of the user device 115 used to download the content, a network trace-route showing the network connection used to reach the user, a credit card number for the user, a digital certificate, a digitally signed message authenticating that the user's private key was used to sign the message, or other user information.

In another embodiment, the Watermark step 350 may embed within a watermark a transactional ID rather than a serial number of a digital certificate. The content data may be transferred from a customer site 270 to the user device 115, and the content data may have a transactional or consumer identification data added transparently to the content data when downloaded to the consumer or their player. An example of the transactional data added by the Watermark step 350 to the content data is illustrated by the case where a consumer's ID is added to the data stream using one or more watermarking techniques. The content data after watermarking may optionally be encrypted using a public key or session key known by the consumer or their player. Once content data is available for transmission in the form of a portion of the data stream, or the entire data stream, the Watermark step 350 may add the consumer's ID number that is associated with the user device's 115 digital certificate into the data stream as part of the entire watermark. The watermarking of the consumer's ID number to downloaded content will not impair the content nor invalidate other watermarks already in the content, such as the identity of the content owner.

In one embodiment, watermarking may be performed by the Watermark step 350 on virtually any digital data stream by appropriately switching or modulating insignificant bits of information with a signal, for example phase, amplitude, video blanking, or other signals, "on" or "off" inside the data stream in such a way as not to be noticed by the consumer. By knowing where the bits start and stop, the Watermark step 350 strings these bits together in order to create larger segments of data. The resulting string of such data segments clearly identifies the user, a legally binding signed transactional log, or the user's player, computer or other devices. As the Transaction module 210 digitally signs the transactional ID, a legally binding identification of the user is provided, as the user's private encryption key must be used to complete a transaction. The term "payload" refers to such string of characters that the Watermark step 350 may embed within a watermark.

The Watermark step 350 is accomplished for various media forms without degrading the quality of the content. In the example of watermarking music content, the Watermark step 350 sets certain insignificant "on" and "off" bits as the various sounds transition from one state to another state. By using least significant bits (LSB) within the stream at points where these transitions are taking place, the user will not be able to discern any difference between a stream with a watermark and a stream without a watermark. There are additional places where music may be watermarked that are contemplated by this application. Industry standard music watermarking technology may additionally be used.

In the example of watermarking video content, there are more opportunities for the Watermark step 350 to embed "on" and "off" bits or modulated data within a video stream than there are within an audio stream. There are certain unused spaces within the video stream where the Watermark step 350 may carefully place "on" and "off" bits. There is also an opportunity to place "on" and "off" bits within numerous LSBs of the video stream so the consumer will not be able to discern any difference. There are additional ways to embed watermarks in a video stream that are contemplated by this application. Industry standard video watermarking technology may be used by this invention.

In the example of watermarking software content, watermarking may be simpler than either music or video content. A software publisher may reserve an area where the Watermark step 350 may inject such a watermark into the data stream without effecting the performance of the software. The software publisher may also identify areas within the data stream that will not cause any harm to the performance of the software program. Additionally, even without the publisher's assistance, it may be possible for the Watermark step 350 to locate areas that are available within the stream of software data in order to place either bits or bytes of information. There are additional ways to embed bits or bytes into a software stream that are contemplated by this application. Industry standard software watermarking technology or encrypted copyright notices may be used by this invention.

In the example of watermarking literary content, adding a watermark to book information is different than adding a watermark to music, video, or a software data stream. Within a book, it may be best for the Watermark step 350 to add or subtract a small amount of space between certain letters that are printed in the book. Adding a little more space between one carefully chosen letter and the next contiguous letter may be interpreted as being an "on" bit, whereas not having the extra space between one carefully chosen letter and the next contiguous letter may be interpreted as being an "off" bit. By knowing where to start and end, it may be possible to create a software program that scans the pages of a book and produces an ID number that is associated with the consumer's digital certificate. There are additional ways to embed "on" and "off" bits between letters of a book that are contemplated by this application. Industry standard electronic book watermarking technology may be used by this invention.

By the Watermark step 350 redundantly adding such "on" and "off" bits throughout the stream and by encrypting these "on" and "off" bits, it is anticipated that it will be very difficult for unauthorized persons to build a mechanism that can remove this digital certificate ID information from the stream of data, whether the stream contains music, video, software, multi-media, printed material, or other media content.

The watermarking operations of the Watermark step 350 may be used with other security technologies that are typically referred to as DRM (Digital Rights Management) models. DRM models are typically systems that use passwords, keys, smart cards, wands, tickets, licenses, or other independent mechanisms that will unlock a content file. For example, Microsoft Corporation uses a DRM model when it distributes many of its programming languages. With a DRM model, if the user does not have the proper license for the programming language or system installed on the hard drive, then the programming language or system will not run. DRM models work similarly with content files. The content file by itself is not enough to play or view the content. An external mechanism such as a license or a password, for example, must be used in coordination or combination with the content file in order to play or view the content file.

An embodiment of the Watermark step 350 will enhance these DRM models. The combination of DRM and watermarking with digital certificates may include the following operations:

1) Issuing a digital certificate for a single content item and storing it in a database.
2) Storing at the database a clear text id, or a user (person or device downloading content) signed text id/message used for authentication purposes.
3) Watermarking the content using the serial number of the digital certificate that was issued, or a signed transactional id for this transaction.
4) Encrypting by the DRM system of the watermarked content file and downloading this encrypted file to the user.

A DRM model may easily create an encrypted version of the watermarked content data. This may include the following:

1) Watermarking the content file using either the serial number for a digital certificate (signed or unsigned) or a private key signed transactional id. In fact, the user identification for the DRM system user may be watermarked into the content data at this point in addition to, or instead of the digital certificate serial, digital certificate serial number or transactional ID.
2) Encrypting the content file inside a DRM enclosure.
3) Delivering the content to consumer.
4) Unlocking the DRM enclosure by the user using the correct DRM decryption key.
5) Playing the content file, however a watermark still exists within the content file.
6) Positively identifying a user should such a hacker decide to hack the signals and pass the decrypted content data in an unauthorized manner.

Typically the user will have the appropriate key to unlock a DRM enclosure. The key to unlock the encrypted DRM data may be a read-only file, a password, a hardware device such as a decryption key dongle, or other external device or file that works to initiate the decryption process of a DRM content file. In the case where the user does not have an appropriate key for the DRM content file, then the content file cannot be successfully played. If the user does have an appropriate key, however, and the user passes the DRM content file to another person without the appropriate key, then only the original user may successfully play the DRM content file. The new person will not be able to successfully play the DRM content file in this situation.

Watermarks within content data may contain other fields besides digital certificate ID. For example, the "Date Content Is Downloaded" may be added by the Watermark step 350 to the content data stream along with the digital certificate ID. Other important fields may additionally be added within the watermark and is contemplated by this application.

In another embodiment, the Watermark step 350 may embed a transactional ID in a watermark. A transactional ID is a code or string of characters used as the payload of a watermark rather than the serial number of a digital certificate. An example of a watermark with a transactional ID may include:

1) A unique hash that will authenticate the transactional ID. Such a hash may prevent invalid transactional IDs from being mistaken for authentic ones.
2) A CRC (cyclical redundancy check) to authenticate the transactional ID.
3) A signature using a private key that is either stored inside the user device 115 or at the Certification Authority 260.
4) A transactional ID number generated using the following operations:
   a) The user registers with a Certificate Authority (CA) 260 and obtains a public/private key pair from the CA, trusted authority, bank, credit card provider, or other respected institution.
   b) When the user requests to download digital content, a transactional serial number, string or unique identifying message may be sent from the customer site 270 download site to the user's computer or player device.
   c) The user's computer or player device will sign the transactional ID using the user's private key. The private key was issued in step 'a' above or is a key or serial number embedded in a computer or player device and the embedded key or player serial number is registered with a CA recognized by the content download site.
   d) The content download site may use the user's public key and verify the signed transactional ID before allowing the transfer to occur.
   e) The customer site 270 may add additional information to the signed transaction ID to a content provider database that will help to validate that the user is actually the person who downloaded the content. This information may include network trace-route information, a serial number of a computer or player device used to download the content, network gateway routing information, Internet to cable modem gateway, Internet to broadband router, gateway routing information that identifies the user as a subscriber on a particular cellular telephone device, a cable modem system, or other digital networked system. This network trace-route information may also be added transparently to the digital content using industry standard watermarking techniques.
   f) The signed transactional ID may be transparently added to the digital content using watermarking technology before or during the download to the user.

In the case of a transaction ID, the electronic signing of the transaction ID above is replaced by logging transactions as they take place. By hashing the transaction ID, providing a CRC check, or otherwise authenticating the process for the transaction ID, the transaction ID may thereby be authenticated in a way similar to electronically signing a digital certificate.

As a further example, a cellular telephone device may have a unique serial number such that when the cellular telephone is used to download content the cellular phone's serial number may be used to verify that the user/device is authorized for content downloading. As disclosed by this application, an additional stage is taken for the use of a device serial number to identify a user, which is the linking of an encryption key for the device to the serial number of the device. This linking may be performed in a player device, such that the player device may be issued a public/private key pair, or the storage by the cellular telephone provider, or Internet to cellular network gateway of a link from the cellular telephone's serial number to a public/private key pair or digital certificate for this telephone device. Not only is this useful with cellular telephones, but the technology may be applied to any device that contains a unique serial number, for example PDA's, cable/dsl/pstn modems, web TVs, Internet appliances, MP3 players, computers, or other devices that may directly or indirectly access digital content.

Along with the digital certificate serial number, or in place of the digital certificate serial number, another string of bytes may be included within the watermark. This additional string of bytes may be a clear text message that is known to the customer site 270 B2C partner. One example of such a clear text message that is known to the customer site 270 B2C partner is the actual serial number itself. Other clear text strings may be used and are contemplated by this application. These other strings of bytes may then be encrypted with the user's private key and stored in an encrypted fashion along with the digital certificate serial number within the watermark.

In one embodiment, this additional encrypted string of clear text characters known by the customer site 270 B2C partner provides further proof that the user was responsible for the content download transaction. The customer site 270 B2C partner, regardless of which server or system is used, must store the actual digital certificate, the consumer's public key, and a predetermined clear text string that will be used to further prove the authenticity of the digital certificate serial number, as well as the fact that the consumer is ultimately responsible for the content download. This predetermined clear text message may instead include a plurality of other authentication methods to verify the validity of the digital certificate serial number.

In a further embodiment, the serial number within the watermark may be authenticated by the following operations:
1) Generating a new and unique digital certificate or transaction ID serial number
2) Encrypting a unique serial number for this new digital certificate or transaction ID using the user's private key
3) Embedding this encrypted serial number with the digital content using watermarking technology
4) Keeping this encrypted serial number and the user's public key in a database at the Certification Authority 260
5) Keeping the original (decrypted) serial number also in the database at the Certification Authority 260
6) Retrieving the encrypted serial number from within the watermark for examination
7) Contacting the Certification Authority 260 and passing it the encrypted serial number
8) The Certification Authority 260 finding a match for the encrypted serial number and retrieving the user's public key.
9) The Certification Authority 260 decrypting the serial number
10) Completing authentication of the serial number by verifying that the decrypted serial number yields characters that are consistent with an authentic serial number and the decrypted serial number matches the original serial number kept in the database of the Certification Authority 260
11) The Certification Authority 260 determining which customer site 270 B2C partner issued the digital certificate
12) The Certification Authority 260 retrieving the remaining data, if any, pertaining to the digital certificate from the customer site 270

In a further embodiment, to increase the security provided by the watermark by making the hacking of invalid watermarks more difficult, several additional operations may be included with the technique described above. For example, multiple watermarks with different payloads may be included, watermarks may be placed at random places within each content file, watermarks may be of variable length, the same watermark may be placed in multiple locations within the same content file, or other ways of thwarting hacking may be included within the contemplation of this application. Depending on the requirements of the media rights owners and the distributors of media content, some or all of the watermarking features and capabilities described above, or other features and capabilities, may need to be employed to thwart hackers and still perform all of the necessary ALAM module 220 operations.

In a further embodiment, a media content physical copy has two or more watermarks within the content. An example of using multiple watermarks includes one serial number being the master serial number and a second serial number being the physical copy serial number. In another embodiment, the second serial number takes the place of the serial number for the master copy. In this embodiment, the physical copy serial number refers to the master copy digital certificate as being a "child" or subordinate certificate. Another embodiment includes adding three watermarks to the downloaded content, including a copyright mark being watermarked into the digital content along with the digital certificate number for the user downloading the content, as well as the ID number for the customer site 270, for example a content source or content distributor.

The Transaction module 210 process includes a Transfer Content to User step 360. Once the consumer is granted the authorization to download certain content materials, the content materials now accessible to the consumer is updated in the archive server 240. The transaction database 214 may thus hold the actual transactions that have taken place for the consumer and the archive server 240 may hold either the pointer to the physical content or the physical content itself. As one skilled in the art will recognize, the transactional database 214 and archive database 244 may be located on the same computer or system, or distributed across various or multiple computers or systems. In one embodiment, the pointer to the data may be a pointer to the physical data that resides with the customer sites 270. In another embodiment, a number or string of characters that uniquely identify the content ordered by the consumer may be used rather than a pointer to the content data. When the content material is to be downloaded to the user, the archive server 240 may be accessed in order to get a pointer to the physical data, or alternatively to locate the physical data on the storage facilities within the archive server 240.

A consumer may direct the data stream away from one device and toward another device at the user's request, thereby allowing the consumer to play content material while leaving one physical location and entering another. For example, a consumer may request a download of music while in the home. Before the particular music content has completed playing, the consumer may decide to leave the home and begin to drive in the car. In addition, before the music content has completed playing, the consumer may next arrive at a work location.

The stream of music may initially be directed to a device within the consumer's home. When the consumer realizes that they will be entering the car, the consumer may contact the content distribution system 200 or customer site 270 and request that the data feed be directed toward a car radio with wireless download capability. Before arriving at the work location, the consumer may likewise request that the data feed be directed to a PC at work. In this way, since this content distribution system 200 streams data to user devices 115, it is possible to switch device addressing, and even encryption methods, as the consumer travels from one physical location to another.

In a further embodiment, more download servers than just those described above may exist. In many cases, these servers will be heavily loaded with download requests. It is within the contemplation of this application to distribute the load over a bank of servers that may exist at different physical locations all over the world. This method of distributing servers is often referred to as Load Balancing and is in widespread practice in the industry.

Another example of accomplishing Load Balancing is to use a method such as the popular Hot Line system. Hot Line has a network of both servers and clients that are distributed among thousands or potentially even millions of users. In this system, all clients must connect to a server, after which the client may find the files that are available for downloading, and possibly download one or more of these files. The client may then connect to another server within this Hot Line Network in order to find and download more files. The servers may likewise connect to both clients and other servers to find files that are available for download, and then download one or more of these files.

A further example of accomplishing Load Balancing is to use a peer-to-peer system, which inherently accomplishes Load Balancing. It is contemplated by this application that there are or may be additional example of Load Balancing systems in the industry.

The above Load Balancing systems may include a server or other web connection that monitors download activity to make sure that content downloading is being distributed properly and the consumer is paying the correct amount for each download. Such client/server or peer-to-peer systems should be monitored carefully in order to maintain integrity, security, proper accounting, and authenticity of the downloaded data streams.

Figure 4:
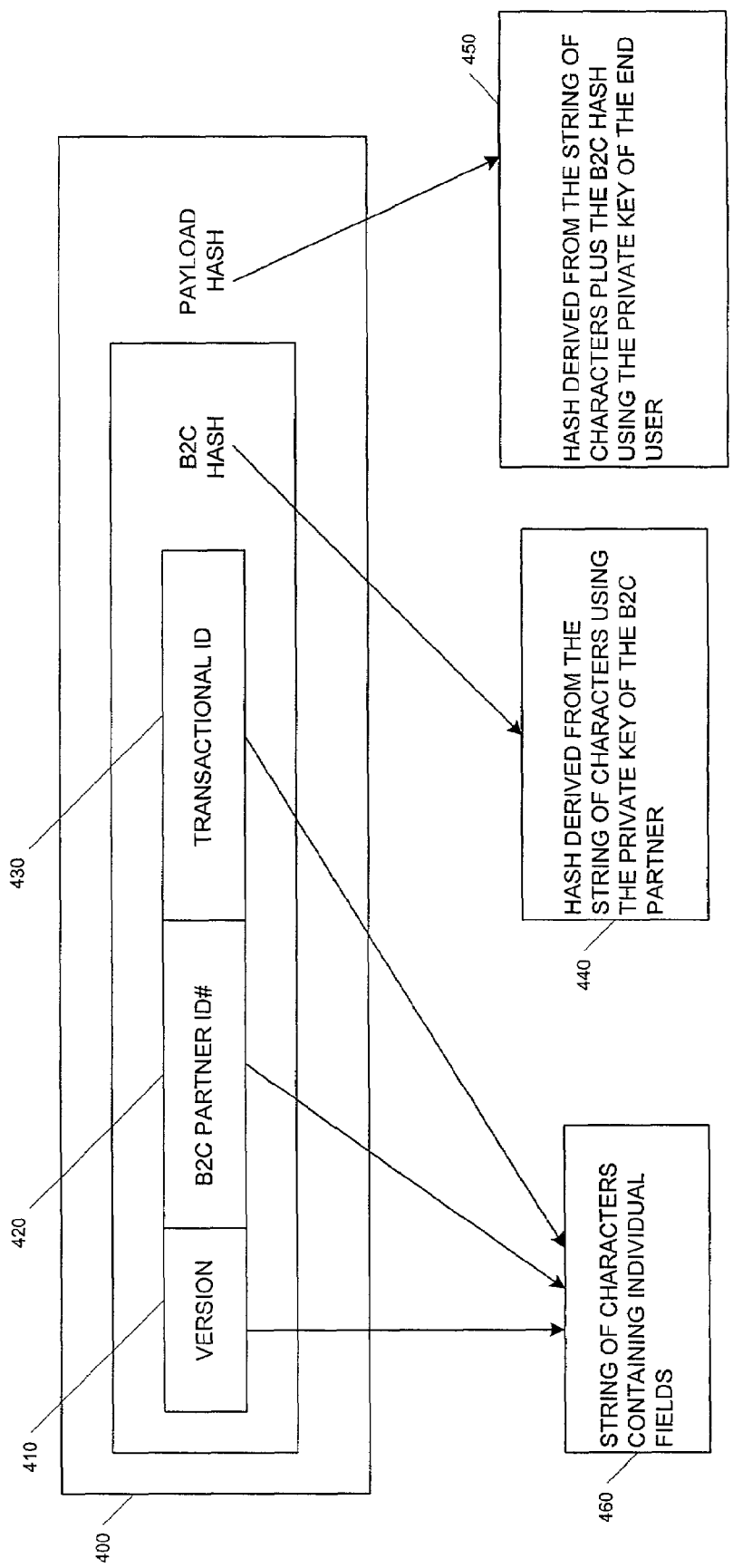
FIG. 4 is a diagram of a typical watermark.

FIG. 4 is a diagram of a typical watermark. The contents of a watermark may include a string of characters divided into fields within the string. These fields are as follows:
1) Payload Version Number 410
2) B2C partner ID 420
3) Transactional ID 430
4) B2C Hash code (derived from 1-3) using B2C partner's private key 440
5) Payload Hash code (derived from 1-4) using user's private key 450

Figure 5:
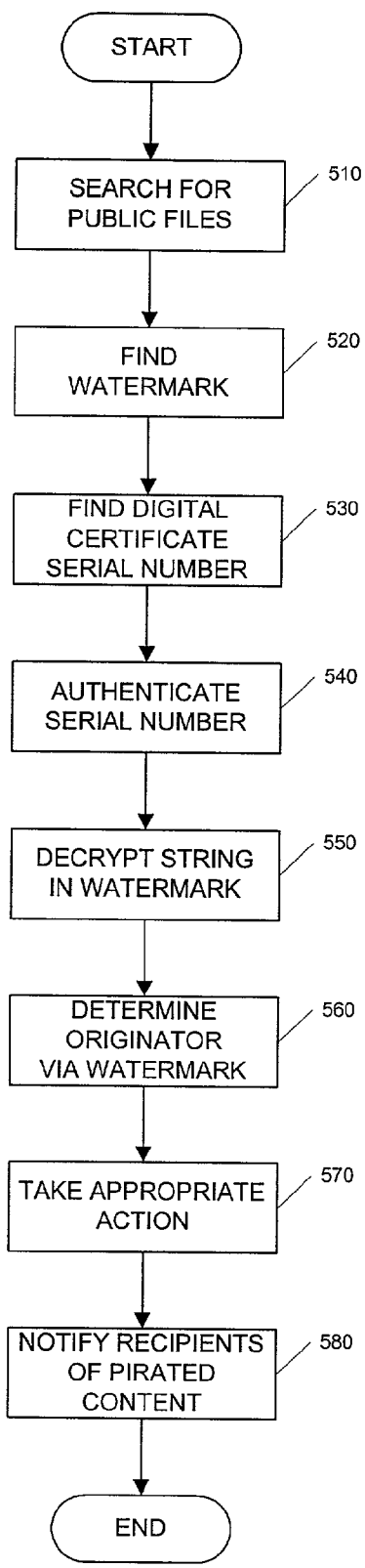
FIG. 5 is a flowchart of a process of detecting unauthorized content files.

FIG. 5 is a flowchart of a process of detecting unauthorized content files performed by the ALAM module 220 of FIG. 2. Each of the blocks of FIG. 5 represents a series of actions or steps. These steps can be carried out by the ALAM module 220 and/or can be carried out by sub-modules within the ALAM module 220 with each block representing one of those sub-modules. Alternatively, various modules of the content distribution system 200 can perform one or more of the steps depicted in FIG. 5.

The ALAM module 220 includes the steps for discovering and prosecuting content pirates, hackers or other inappropriate distributors of media content. These steps may include:
1) Searching and downloading the content files from the Internet, Intranet or other publicly accessible network 510.
2) Locating and identifying the watermark 520.
3) Finding the digital certificate serial number 530.
4) Authenticate the serial number with both the Certification Authority 260 and the customer site 270 B2C partner 540.
5) Decrypt the text string in the watermark using the user's public key 550.
6) Determine pirate's identity and notify as appropriate 560.
7) Take appropriate action against the pirate 570.
8) Notify other users found with the content files on their own systems 580.

Figure 6:
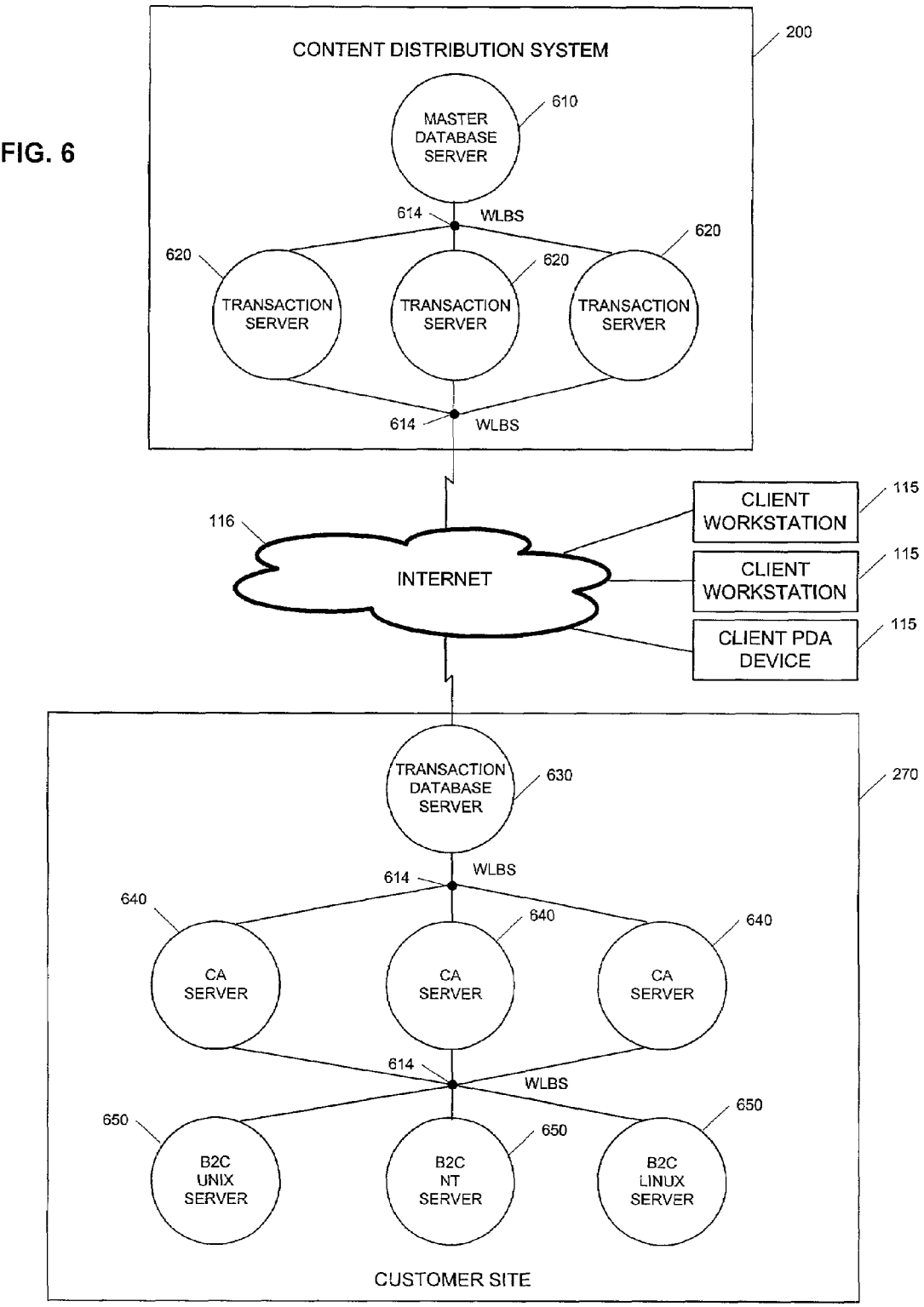
FIG. 6 is a block diagram of a content distribution system and customer site.

FIG. 6 is a block diagram of a content distribution system 200 and customer site 270, for example a B2C partner system. In order to provide binding authentication as to ownership, the technology utilizes digital certificates issued by a Certificate Authority (CA) 260, which are installed on the consumer's user device 115. The CA 260 is owned and operated by the creator of the content distribution system 200 since the digital certificates being issued need only be trusted and validated by its customers. Once a digital certificate is generated for a user, all digital content for that user is signed via watermarking using the user's digital certificate.

Digital certificates are installed on the client workstations 115 using software supplied by the creator of the content distribution system 200. This is in the form of signed Java applets that send, receive and install digital certificates over a secure connection, which for comparison purposes is similar to the functionality provided by the Microsoft Internet Explorer and Netscape Navigator web browsers. The creator of the content distribution system 200 provides this client certificate software to eliminate the cross platform and user interface issues imposed by competing browsers, making the installation and use of this certificate technology transparent to the end user, the consumer.

Each digital certificate issued and each key used in watermarking digital content is stored in the content distribution system 200 master database 218. This master database 218 is used for tracking and auditing purposes to identify digital content that is being illegally copied and shared. Ferret, robot or BOT technology supplied with the content distribution system 200 continually scans the Internet looking for copies of digital content that was watermarked by the content distribution system 200. In the event an illegal copy is found, the master database 218 contains information pointing to the original purchaser who is then contacted for potential legal action or collection of the appropriate fees.

In this example of the system for installing digitally watermarked content on a client workstation 115, the creator of the content distribution system 200 provides a turn-key system for companies wanting to use the technology in their own installation. This method distributes the workload and infrastructure to the customer site 270, for example a B2C partner system, instead of being on a content distribution system 200 site. Software and hardware associated with issuing certificates and watermarking content exists solely at the customers site 270 with the exception of the master audit database 218, which resides at the content distribution system 200 site.

In this example, the transaction database 214 contains the master database 218 used by the content distribution system 200 to store each customer certificate and each key used in watermarking digital content. All fields containing sensitive information, such as a customer name, certificate, or keys, are encrypted using a one-way hash algorithm to prevent hackers from obtaining proprietary information. The transaction database 214 only accepts connections from the designated transaction servers 620, providing an additional layer of security. Each CA server 640 supplied by the creator of the content distribution system 200 to its customers stores a copy of each transaction in the master database 218 located at the content distribution system 200. The customer certificate data contains all of the fields used to create the original customer certificate as well as the resulting certificate and public key. The key data used for watermarking digital content is a separate record with date and time, content type, and content ID fields with a key pointing to the original certificate. The key data consists of an 18-byte hash key created using the clients' digital certificate. This hash key is used by the watermarking software as the key for the embedded watermark. The content distribution system 200 uses the stored key value to determine who a key value belongs to when performing monitoring and enforcement functions. It is anticipated that the databases will see a high volume of accesses, so high capacity servers are likely to be required.

Also in this example, due to the potentially high traffic anticipated for the databases, a transaction server 620 farm may be used to distribute the processing load. The transaction servers 620 in this configuration use Windows Load Balancing Service (WLBS) 614 technology for distributing the workload and to provide a highly scaleable, low cost environment. By using WLBS 614, additional transaction servers 620 may be easily added or removed at will. Transactions may include retrieving or storing certificates, keys and their associated data. Transactions containing sensitive data have the appropriate fields encrypted prior to storing in the database and will be decrypted after retrieving from the database 214. The customer transaction servers 630 only accept connections from the designated CA servers 640 based on their IP addresses, further isolating and securing them from unauthorized outside access.

The Certificate Authority servers 640 in this example create and issue digital certificates as well as generate watermark signature keys, which are used as the key in the digital content watermarking process. The CA servers 640 use WLBS 614 technology for distributing the workload and to provide a highly scaleable, low cost environment. By using WLBS 614, additional CA servers 640 may be added or removed at will. The CA servers 640 receive certificate and key generation requests using a standard application program interface (API) from the customer's B2C server 650 supplied by the creator of the content distribution system 200. The CA server 640 then generates either a new certificate or a new signed watermark key. The new certificate or key is then returned to the B2C server 650 using the same API.

The CA 260 in this example uses the Microsoft PKI Cryptographic Service Provider (CSP) software, which is provided as part of the base operating system in Windows 2000 Server. The number of certificates issued on a particular CA 260 is virtually unlimited based on the amount of available disk space. Each new certificate uses approximately 1 k bytes in the Windows 2000 Registry, leaving room for millions of certificates in each CA 260 server. As a certificate is created, the resulting certificate and the data used to create it are stored in the master database 218 by passing the data as a transaction to the customer transaction server 630. All fields containing sensitive information such as a customer name, certificate, key, etc are encrypted on the transaction server 620 using a one-way hash algorithm to prevent hackers from obtaining proprietary information. The CA servers 640 only accept connections from the designated B2C servers 650, thereby providing an additional layer of security.

The B2C server 650 in this example would typically be a customer's existing web or content server currently used to distribute digital content without the content distribution system 200 watermark. Either a DLL or LIB containing the Watermarking API is installed on the B2C server 650, allowing the customer to easily modify their existing software to call the certificate and watermarking functions provided by the content distribution system 200. In a Windows NT environment, the DLL will be an ActiveX component callable from any ActiveX-aware application such as IIS. On the Unix or Linux platforms, a LIB file will be used. The DLL or LIB contains API calls for creating, installing and retrieving digital certificates between the CA server 640 and a client workstation 115 as well as watermarking digital content files. The B2C server 650 interacts with a Java applet running on the client workstation 115 using the content distribution system 200 API functions.

The client workstations 115 in this example instantiate a Java applet that acts as a client/server process. The applet is signed so it can operate outside the Java sandbox, giving it access to low level Windows and Unix/Linux functions. The applet accepts requests from the B2C server 650 using the content distribution system 200 API for installing and retrieving certificates. The applet only accepts requests from the originating B2C server 650, thereby preventing malicious hackers from accessing the client workstation.

In the case of the client workstation 115 being a PDA type device, not a PC, the communications method and certificate storage and retrieval are different. The non-PC device is considered as not having any permanent local storage available to it, and must have some form of unique identifier, similar to a NIC MAC address, that can be transmitted to the B2C server 650 for authentication. The certificate information is stored on the CA server 640 database. Functions that would normally store and retrieve a certificate from a PC are instead simulated using the device id as the key, and stored or retrieved from the CA server 640 database. It is preferable, though not mandatory, that the device be capable of either SSL connections to retrieve the device ID, or be able to execute an RC2 (block) symmetric encryption algorithm to retrieve the device ID over an unsecured connection.

Figure 7:
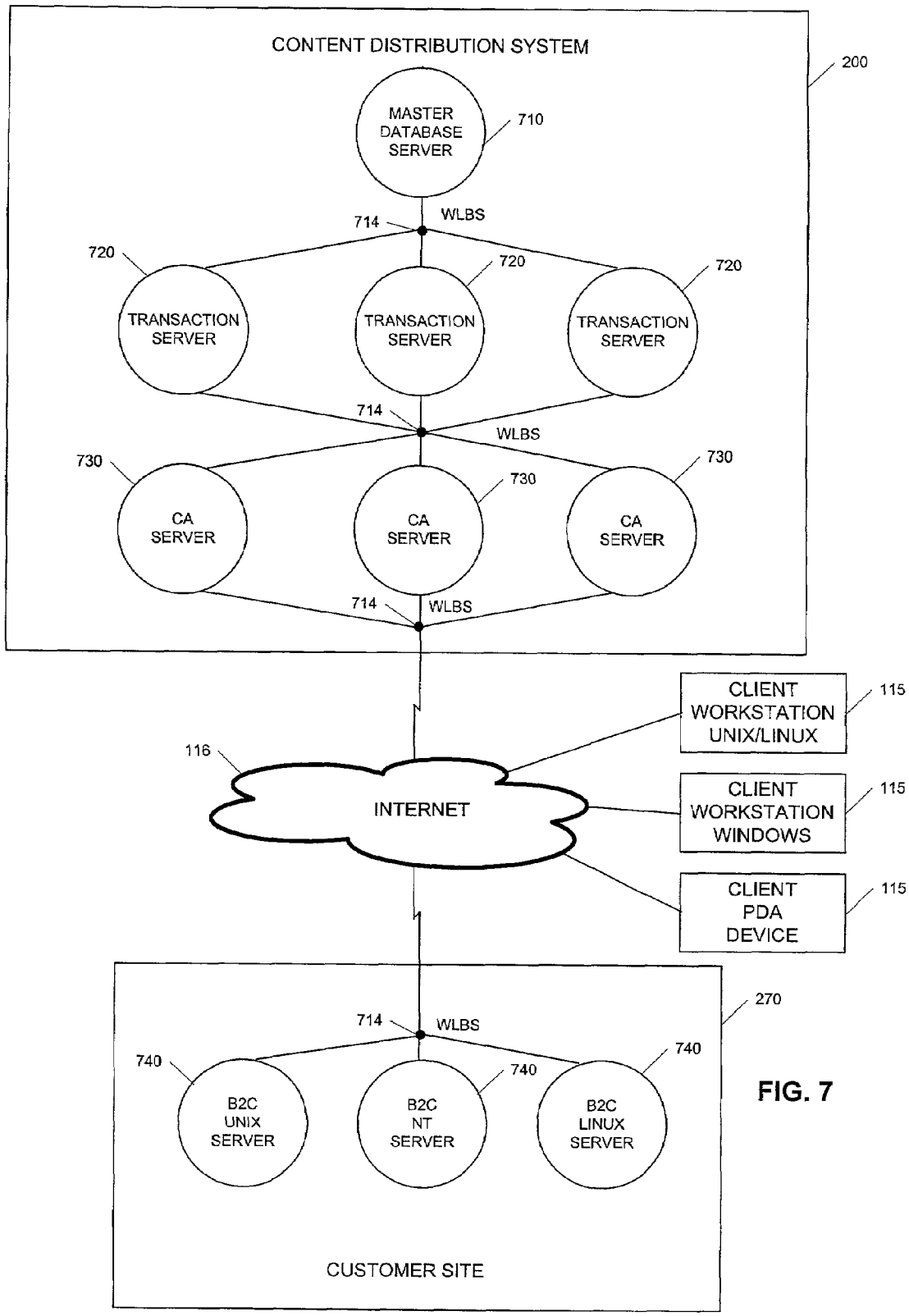
FIG. 7 is a block diagram of a content distribution system and customer site.

FIG. 7 is a block diagram of a content distribution system 200 and customer site 270, which operates in a similar fashion to the example in FIG. 6 above but the Certificate Authority server 730 is now located at the customer site 270. In this example, the creator of the content distribution system 200 provides the Certificate Authority server 730 for issuing and signing digital certificates, but all content is watermarked at the customer site 270 and only the watermarking software is installed at the customer site 270. As certificates are required, the supplied software installed at the customer site 270 contacts the content distribution system 200 CA server 730 and requests a new certificate or generates a signed key for an existing certificate. A new certificate is then installed on the client workstation 115 using the customer B2C server 740 and a Java applet running on the client workstation 115. For a new digitally signed watermark key, the customers B2C server 740 receives the watermark key from the content distribution system 200 CA server 730 and watermarks the content file before sending it to the clients workstation 115.

In this example, the database server 710 contains the master database 218 used by the content distribution system 200 to store each customer certificate and each key used in watermarking digital content. All fields containing sensitive information, for example a customer name, certificate, or key is encrypted using a one-way hash algorithm to prevent hackers from obtaining proprietary information. The database server 710 only accepts connections from the designated transaction servers 720, providing an additional layer of security. Each CA server 730, which may be supplied by the creator of the content distribution system 200 to its customers, stores a copy of each transaction in the master database 218. The customer certificate data contains all of the fields used to create the original customer certificate as well as the resulting certificate and public key. The key data used for watermarking digital content is a separate record with date and time, content type, or content ID fields with a key that points to the original certificate. The key data consists of an 18-byte hash key created using the client digital certificate. This hash key is used by the watermarking software as the key for the embedded watermark. The content distribution system 200 uses the stored key value to determine who a key value belongs to when performing monitoring and enforcement functions. It is anticipated that the database will see a high volume of accesses, so high capacity servers are likely required.

In this example, due to the potentially high traffic anticipated for the database, a transaction server 720 farm is used to distribute the processing load. The transaction servers use the Windows Load Balancing Service (WLBS) 714 technology for distributing the workload and to provide a highly scaleable, low cost environment. By using WLBS 714, additional transaction servers may be easily added or removed at will. Transactions may include retrieving or storing certificates, keys and their associated data. Transactions containing sensitive data have the appropriate fields encrypted prior to storing in the database and are decrypted after retrieving from the database. The transaction servers 720 only accept connections from the designated CA servers 730, based on their IP addresses, further isolating and securing them from unauthorized outside access.

The Certificate Authority servers 730 create and issue digital certificates as well as generate watermark signature keys, which are used as the key in the digital content watermarking process. The CA servers 730 use WLBS 714 technology for distributing the workload and to provide a highly scaleable, low cost environment. By using WLBS 714, additional CA servers 730 may be added or removed at will. The CA servers 730 receive certificate and key generation requests using an application program interface (API), supplied by the creator of the content distribution system 200, from the customer B2C server 740. The CA servers 730 generate either a new certificate or a new signed watermark key. The new certificate or key is then returned to the B2C server 740 using the same API supplied by creator of the content distribution system 200.

The CA 260 uses the Microsoft PKI Cryptographic Service Provider (CSP) software, which is provided as part of the base operating system in Windows 2000 Server. The number of certificates issued on a particular CA 260 is virtually unlimited based on the amount of available disk space. Each new certificate uses approximately 1 k bytes in the Windows 2000 Registry, leaving room for millions of certificates in each CA server 730. As a certificate is created, the resulting certificate and the data used to create it are stored in the master database 218 by passing the data as a transaction to the transaction server 720. All fields containing sensitive information, for example a customer name, certificate, or key, are encrypted on the transaction server 720 using a one-way hash algorithm to prevent hackers from obtaining proprietary information. The CA servers 730 only accept connections from the designated B2C servers 740, providing an additional layer of security.

The B2C server 740 typically is a customer's existing web or content server they currently use to distribute digital content without the content distribution system 200 watermark technology. Either a DLL or LIB containing the Watermarking API is installed on the B2C server 740, allowing the customer to easily modify their existing software to call the content distribution system 200 certificate 320 and watermarking 350 modules. In an NT environment, the DLL may be an ActiveX component callable from any ActiveX aware application such as IIS. On the Unix or Linux platforms, a LIB file may be used. The DLL or LIB contains API calls for creating, installing and retrieving digital certificates between the CA server 730 and a client workstation 115, as well as watermarking digital content files. The B2C server 740 interacts with a Java applet running on the client workstation 115 using the content distribution system 200 API functions.

The client workstations 115 in this example instantiate a Java applet that acts as a client/server process. The applet is signed so it can operate outside the Java "sandbox", giving it access to low level Windows and Unix/Linux functions. The applet accepts requests from the B2C server 740 using the content distribution system 200 API for installing and retrieving certificates. The applet only accepts requests from the originating B2C server 740, preventing malicious hackers from accessing the client workstation 115.

In the case of the client workstation 115 being a PDA type device instead of a PC, the communications method and certificate storage and retrieval is different. The non-PC device is considered as not having any permanent local storage available to it, and must have some form of unique identifier, similar to a NIC MAC address, that can be transmitted to the B2C server 740 for authentication. The certificate information is stored on the CA servers 730 database. Functions that would normally store and retrieve a certificate from a PC instead are simulated, using the device ID as the key, and stored or retrieved from the CA server 730 database. It is preferable, though not mandatory, that the device be capable of either SSL connections to retrieve the device ID, or be capable of executing an RC2 (block) symmetric encryption algorithm to retrieve the device ID over an unsecured connection.

The benefits of a content distribution system 200 as described herein may be summarized to include the following:

1) The customer sites 270 are able to authenticate the consumer before the stream of content data is transmitted
2) The customer sites 270 are free to choose any file type or format desired. In other words, such a Content VPN does not prefer any one data format over any other.
3) The customer sites 270 may make sure the consumer has paid for the content before it is downloaded
4) The customer sites 270 may detect and prosecute consumers who have stolen valuable content. The detection and prosecution functions may be performed in an automated fashion.
5) Customer sites 270 are using standardized, well recognized and well regarded digital certificates in accordance with the X.509 protocol
6) Valuable statistics may be gathered and reported on a regular basis. One form for reporting is to provide these statistics over the Internet.
7) Access providers may freely distribute content data knowing that piracy detection and protection functions exist
8) Access providers are able to select the specific devices they communicate with. For example, cable providers may send the stream directly to set-top boxes, or wireless providers may send the stream directly to wireless devices. There is no interference with or hindrance to the normal operation of these devices. The data is simply a stream being passed between the customer site 270 and the user device 115 via the provider of the connection.
9) The consumer may stream, send via FTP, or otherwise copy the content that has been previously paid for as many times as desired. For example, the consumer may request that the stream be directed to a car radio that uses mobile phone technology every morning at the same time.
10) The consumer may play the content on all of the devices previously defined as belonging to them. Therefore, for example, the consumer may play the content on their PC, TV set, laptop computer, CD player, DVD player, or even a neighbor's CD player. As long as these devices have all been registered, the content will play on each of these devices. However, no other devices will be able to decrypt and play this content.
11) The consumer may select when, how, and which selections will be downloaded. The consumer may indicate the file format because the format of the data is not of concern to such a Content VPN.

What is claimed is:

1. A computerized method to register electronic media from an end user device, comprising:
   downloading electronic media obtained from a content provider onto the end user device;
   uploading a request to register the electronic media from the end user device to a registry system;

determining whether the end user device has a valid security identifier;
if the end use device does not have a valid security identifier, then prompting the end user device to obtain a valid security identifier;
identifying the type of content to be registered;
uploading the electronic media to be registered from the end user device to the registry system;
generating a unique identifier for the electronic media to be registered;
placing a watermark in the electronic media to be registered to create a watermarked electronic media, the watermark including the unique identifier and information based on the valid security identifier;
registering the electronic media using the watermark; and
transmitting a copy of the watermarked electronic media back to the end user device.

2. The method of claim 1 wherein the valid security identifier is a symmetrical encryption key.

3. The method of claim 1 wherein the valid security identifier is a private key and a public key pair.

4. The method of claim 3 further comprising signing a clear text message with the private key of the device and storing the signed message in addition to the unique identifier as a watermark payload.

5. The method of claim 3 further comprising creating a message digest of a portion of the unique identifier and encrypting the message digest with the private key of the device and applying the encrypted message digest in addition to the unique identifier as a watermark payload.

6. The method of claim 3 further comprising encrypting a clear text message with the public key and placing the encrypted message within the watermark.

7. The method of claim 3 further comprising storing transactional data in a transaction database.

8. The method of claim 7 further comprising storing the public key of the device in the transaction database.

9. The method of claim 7 wherein the transactional data comprises a copy of the watermarked electronic media.

10. The method of claim 7 wherein the transactional data comprises an email address.

11. The method of claim 10, further comprising sending an email message to the end user device after the electronic media is registered.

12. The method of claim 3 further comprising storing the public key of the device in the transaction database.

13. The method of claim 3 wherein the watermark includes a clear text message encrypted with a public key of a system operator.

14. The method of claim 1 wherein the unique identifier is a serial number or message number.

15. The method of claim 1 further comprising encrypting a clear text message with a public key common to a group of system users and applying the public key encrypted message as a watermark payload.

16. The method of claim 15 further comprising storing the clear text message in a transaction database.

17. The method of claim 1 further comprising storing registration data in a registration database.

18. The method of claim 1 wherein the watermark includes a clear text message encrypted with a public key of a system operator.

19. The method of claim 1 wherein the watermark is placed in the electronic media in a random location.

20. The method of claim 1, further comprising providing a reward to a user of the end user device following registration of the electronic media.

21. The method of claim 1, further comprising detecting the watermarked media on a second device, and determining whether a registry database includes a record of the watermark and a security identifier of the second device.

22. A computerized method for operating an electronic media registry system, comprising:
receiving electronic media from a content provider at an end user device;
uploading a request to register the electronic media from the end user device to the electronic media registry system;
determining whether the end user device has a valid digital certificate having a private key and a public key pair;
if the end user device does not have a valid digital certificate, then prompting the end user device to obtain a valid digital certificate;
identifying the type of content to be registered;
uploading the electronic media to be registered to the electronic media registry system from the end user device;
generating a unique identifier for the electronic media to be registered;
placing a watermark in the electronic media to be registered to create the watermarked electronic media, the watermark including the unique identifier and information based on at least part of the valid digital certificate;
registering the watermark and the watermarked electronic media; and
providing a copy of the watermarked electronic media back to a user of the end user device.

23. The method of claim 22 wherein watermarked electronic media is a software program.

24. A computerized method for operating an electronic media registry system, comprising:
receiving electronic media from a content provider at an end user device
uploading a request to register the electronic media from the end user device to a registry system;
determining whether the end user device has a valid digital certificate having a security identifier;
if the end user device does not have a valid digital certificate having a security identifier, then prompting the end user device to obtain a valid security identifier;
identifying the type of content to be registered;
uploading the electronic media to be registered to the electronic media registry system from the end user device;
generating a unique identifier for the electronic media to be registered;
placing a watermark in the electronic media to be registered to create the watermarked electronic media, the watermark including the unique identifier;
registering the watermark and the watermarked electronic media; and
transmitting a copy of the watermarked electronic media back to the end user device.

25. The method of claim 24 wherein watermarked electronic media is a software program.

* * * * *